(12) United States Patent
Prideaux-Ghee et al.

(10) Patent No.: US 11,030,808 B2
(45) Date of Patent: Jun. 8, 2021

(54) GENERATING TIME-DELAYED AUGMENTED REALITY CONTENT

(71) Applicant: PTC Inc., Needham, MA (US)

(72) Inventors: Stephen Prideaux-Ghee, Bristol (GB); Andre Gosselin, Montreal (CA); Neil Potter, Cambridge (GB); Orit Itzhar, Needham, MA (US); Aakash Chopra, Austin, TX (US)

(73) Assignee: PTC Inc., Needham, MA (US)

( * ) Notice: Subject to any disclaimer, the term of this patent is extended or adjusted under 35 U.S.C. 154(b) by 0 days.

(21) Appl. No.: 15/789,329

(22) Filed: Oct. 20, 2017

(65) Prior Publication Data

US 2019/0122435 A1    Apr. 25, 2019

(51) Int. Cl.
     *G06T 19/00*      (2011.01)
     *G06T 7/73*      (2017.01)
     *G06T 15/20*      (2011.01)
     *G06T 19/20*      (2011.01)

(52) U.S. Cl.
CPC ............ *G06T 19/006* (2013.01); *G06T 7/75* (2017.01); *G06T 15/20* (2013.01); *G06T 19/20* (2013.01); *G06T 2207/10028* (2013.01); *G06T 2215/16* (2013.01)

(58) Field of Classification Search
None
See application file for complete search history.

(56) References Cited

U.S. PATENT DOCUMENTS

| 9,361,716 B1 | 6/2016 | Erikson |
| 9,754,413 B1 | 9/2017 | Gray |
| 2004/0100556 A1 | 5/2004 | Stromme |
| 2012/0324213 A1* | 12/2012 | Ho ..................... G06F 1/1626 713/100 |

(Continued)

FOREIGN PATENT DOCUMENTS

| WO | WO-2016/064435 A1 | 4/2016 |
| WO | WO-2016/179248 A1 | 11/2016 |
| WO | WO-2018/213702 A1 | 11/2018 |

OTHER PUBLICATIONS

Final Office Action for U.S. Appl. No. 15/146,398, 24 pages (dated Mar. 21, 2018).

(Continued)

*Primary Examiner* — Kyle Zhai
(74) *Attorney, Agent, or Firm* — Burns & Levinson LLP

(57) ABSTRACT

An example method includes: obtaining an image of an object captured by a device during relative motion between the object and the device; determining a location of the device relative to the object during image capture based on one or more attributes of the object in the image; storing the image of the object and the location of the device during image capture; mapping a 3D graphical model representing the object to the object in the image based, at least in part, on the location of the device; receiving, at a time subsequent to capture of the image, first data representing an action to be performed for the object in the image; and generating second data for use in rending content on a display device, where the second data is based on the image stored, the location of the device stored, and at least some information from the model.

36 Claims, 16 Drawing Sheets

(56) References Cited

U.S. PATENT DOCUMENTS

| | | | |
|---|---|---|---|
| 2013/0201185 A1* | 8/2013 | Kochi | G06F 3/011 345/419 |
| 2014/0186002 A1 | 7/2014 | Hanaya et al. | |
| 2014/0310595 A1 | 10/2014 | Acharya et al. | |
| 2014/0333667 A1* | 11/2014 | Jung | G06T 11/00 345/633 |
| 2015/0029222 A1 | 1/2015 | Hofmann | |
| 2015/0052479 A1* | 2/2015 | Ooi | G06F 3/04815 715/810 |
| 2015/0170256 A1* | 6/2015 | Pettyjohn | G06Q 30/0639 705/14.49 |
| 2015/0332512 A1 | 11/2015 | Siddiqui et al. | |
| 2016/0005211 A1 | 1/2016 | Sarkis et al. | |
| 2016/0291922 A1* | 10/2016 | Montgomerie | G06F 3/1462 |
| 2016/0328883 A1 | 11/2016 | Parfenov et al. | |
| 2017/0068314 A1 | 3/2017 | Fu et al. | |
| 2018/0025544 A1* | 1/2018 | Schoeller | G06T 19/006 |
| 2018/0341808 A1 | 11/2018 | Holzer et al. | |
| 2019/0120619 A1 | 4/2019 | Miura | |
| 2019/0122027 A1 | 4/2019 | Prideaux-Ghee et al. | |

OTHER PUBLICATIONS

File History of U.S. Appl. No. 15/146,398, 195 pages.
International Preliminary Report on Patentability for PCT/US2016/030720 (Augmented Reality System, filed May 4, 2016), issued by IB/WIPO,15 pages (dated Nov. 16, 2017).
International Search Report for PCT/US2016/030720, 6 pages (dated Sep. 4, 2016).
Invitation to Pay Additional Fees and, Where Applicable, Protest Fee for PCT/US2016/030720, 7 pages (dated Jul. 11, 2016).
Nicolai, T. and Michelis, D., The Web of Augmented Physical Objects, Proceedings of the ICBM, 340-346 (2005).
Office Action for U.S. Appl. No. 15/146,398, 23 pages (dated Aug. 25, 2017).
Written Opinion for PCT/US2016/030720, 12 pages (dated Sep. 4, 2016).
International Search Report for PCT/US2018/033385 (Augmented Reality System filed May 18, 2018), issued by ISA/EP, 4 pages (dated Jul. 25, 2018).
Office Action for U.S. Appl. No. 15/789,329, 34 pages (dated Sep. 7, 2018).
Office Action for U.S. Appl. No. 15/146,398, 24 pages (dated Oct. 4, 2018).
Office Action for U.S. Appl. No. 15/789,341, 35 pages (dated Sep. 7, 2018).
Written Opinion for PCT/US2018/033385 (Augmented Reality System filed May 18, 2018), issued by ISA/EP, 7 pages (dated Jul. 25, 2018).
Office Action for U.S. Appl. No. 15/789,341, 21 page (dated Mar. 8, 2019).
Office Action for U.S. Appl. No. 15/789,316, 16 pages (dated May 23, 2019).
Ong, S.K. et al., Augmented Reality Aided Assembly Design and Planning, Annals of the CIRP 56(1):49-52 (2007).

\* cited by examiner

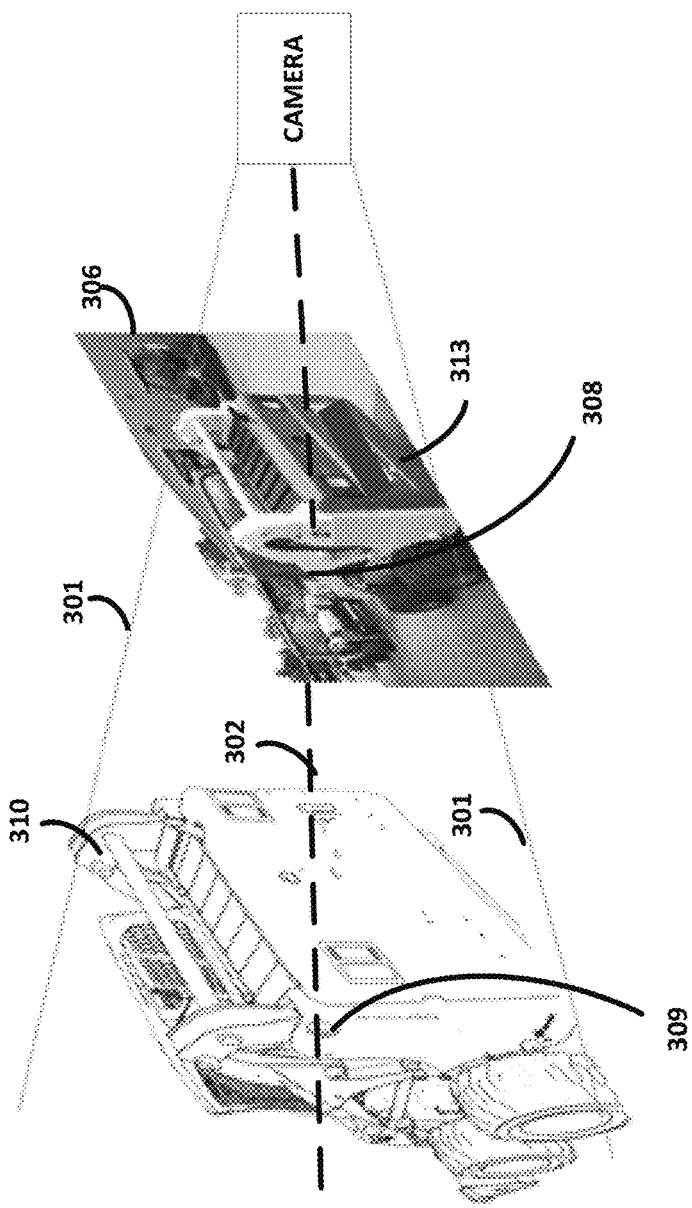
FIG. 5A
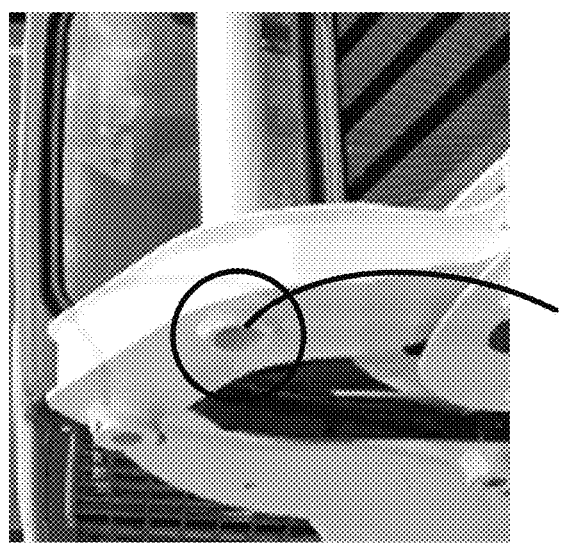
FIG. 5B
FIG. 5

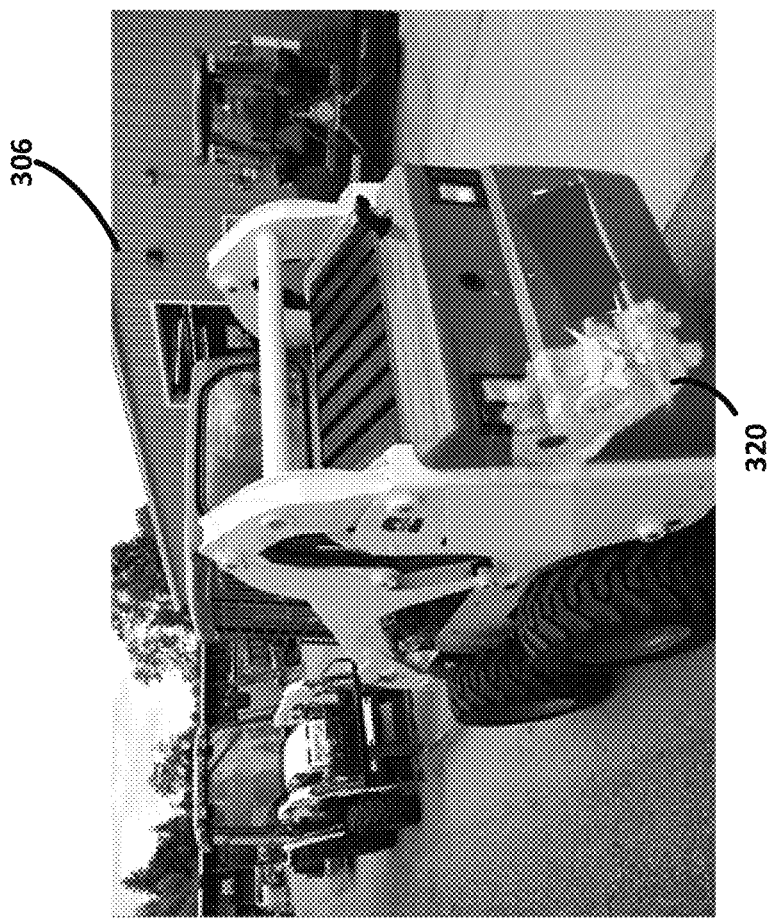
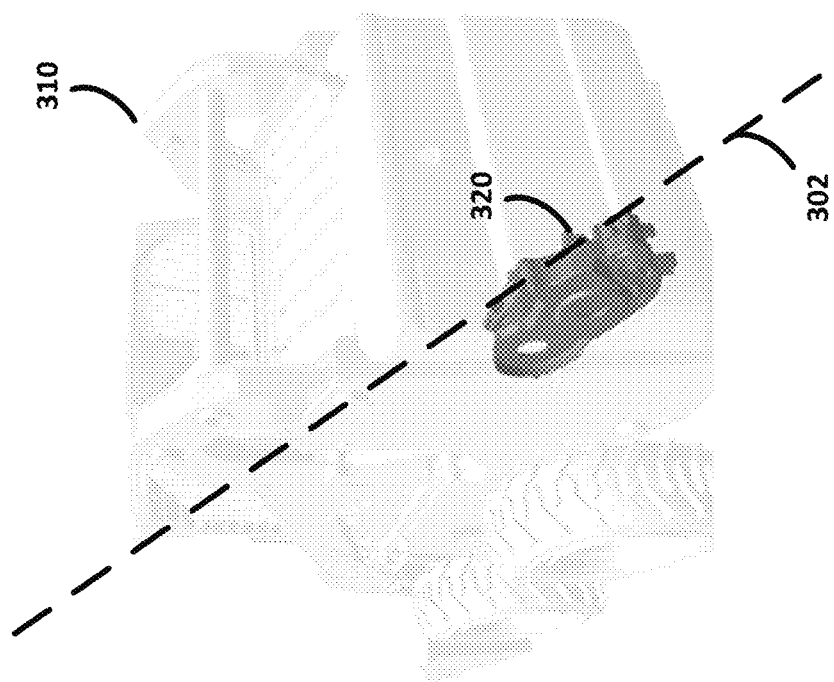
FIG. 6B
FIG. 6A
FIG. 6

GENERATING TIME-DELAYED AUGMENTED REALITY CONTENT

TECHNICAL FIELD

This specification relates generally to generating time-delayed augmented reality content.

BACKGROUND

Augmented reality (AR) content is produced by superimposing computer-generated content onto depictions of real-world content, such as images or video.

The computer-generated content may include graphics, text, or animation, for example.

SUMMARY

An example method performed by a computing system includes: obtaining an image of an object captured by a device during relative motion between the object and the device; determining a location of the device relative to the object during image capture based on one or more attributes of the object in the image; storing, in computer memory, the image of the object and the location of the device during image capture; mapping a three-dimensional (3D) graphical model representing the object to the object in the image based, at least in part, on the location of the device, with the 3D graphical model including information about the object; receiving, at a time subsequent to capture of the image, first data representing an action to be performed for the object in the image; and in response to the first data, generating second data for use in rending content on a display device, with the second data being based on the image stored, the location of the device stored, and at least some of the information from the 3D graphical model. The example method may include one or more of the following features, either alone or in combination.

The second data may be based also on the action to be performed for the object in the image. The content may include the image augmented based on the at least some of the information from the 3D graphical model.

The example method may include receiving an update to the information; and storing the update in the 3D graphical model as part of the information. The content may include the image augmented based on the update and presented from a perspective of the device that is based on the location. The update may be received from a sensor associated with the object. The sensor may provide the update following capture of the image by the device. The update may be received in real-time, and the second data may be generated in response to receipt of the update.

The image may be a frame of video capture by the device during the relative motion between the object and the device. The location may include a position and an orientation of the device relative to the object for each of multiple frames of the video. The content may include the video augmented with at least some of the information and presented from a perspective of the device.

Determining the location may include: obtaining a first size of the object shown in the image, with the first size being among the one or more attributes; obtaining a second size of the object from the 3D graphical model; and comparing the first size to the second size to determine a distance between the device and the object, with the distance being part of the location. Determining the location may include: identifying a feature of the object shown in the image, with the feature being among the one or more attributes; and determining an orientation of the object relative to the device based on the feature and based on the information about the object in the 3D graphical model, with the orientation being part of the location. Determining the location of the device may include updating the location of the device as relative positions between the object and the device change. Mapping the 3D graphical model to the object may be performed for updated locations of the device.

Mapping the 3D graphical model to the object in the image may include associating parts of the 3D graphical model to corresponding parts of the object shown in the image. A remainder of the 3D graphical model may represent parts of the object not shown in the image being positioned relative to the parts of the 3D graphical model overlaid on the parts of the object shown in the image.

The at least some information from the 3D graphical model may represent components interior to the object.

Any two or more of the features described in this specification, including in this summary section, may be combined to form implementations not specifically described in this specification.

All or part of the processes, methods, systems, and techniques described herein may be implemented as a computer program product that includes instructions that are stored on one or more non-transitory machine-readable storage media, and that are executable on one or more processing devices. Examples of non-transitory machine-readable storage media include, e.g., read-only memory, an optical disk drive, memory disk drive, random access memory, and the like. All or part of the processes, methods, systems, and techniques described herein may be implemented as an apparatus, method, or system that includes one or more processing devices and memory storing instructions that are executable by the one or more processing devices to perform the stated operations.

The details of one or more implementations are set forth in the accompanying drawings and the description below. Other features and advantages will be apparent from the description and drawings, and from the claims.

DESCRIPTION OF THE DRAWINGS

FIG. 5, comprised of FIGS. 5A and 5B, shows, conceptually, a ray that is projected to, and through, an image of an object and that also impacts a digital twin for the object.

FIG. 6, comprised of FIGS. 6A and 6B, shows, conceptually, a ray projected to, and through, an image of an object, and AR content generated based on that ray.

Like reference numerals in different figures indicate like elements.

DETAILED DESCRIPTION

Figure 1:
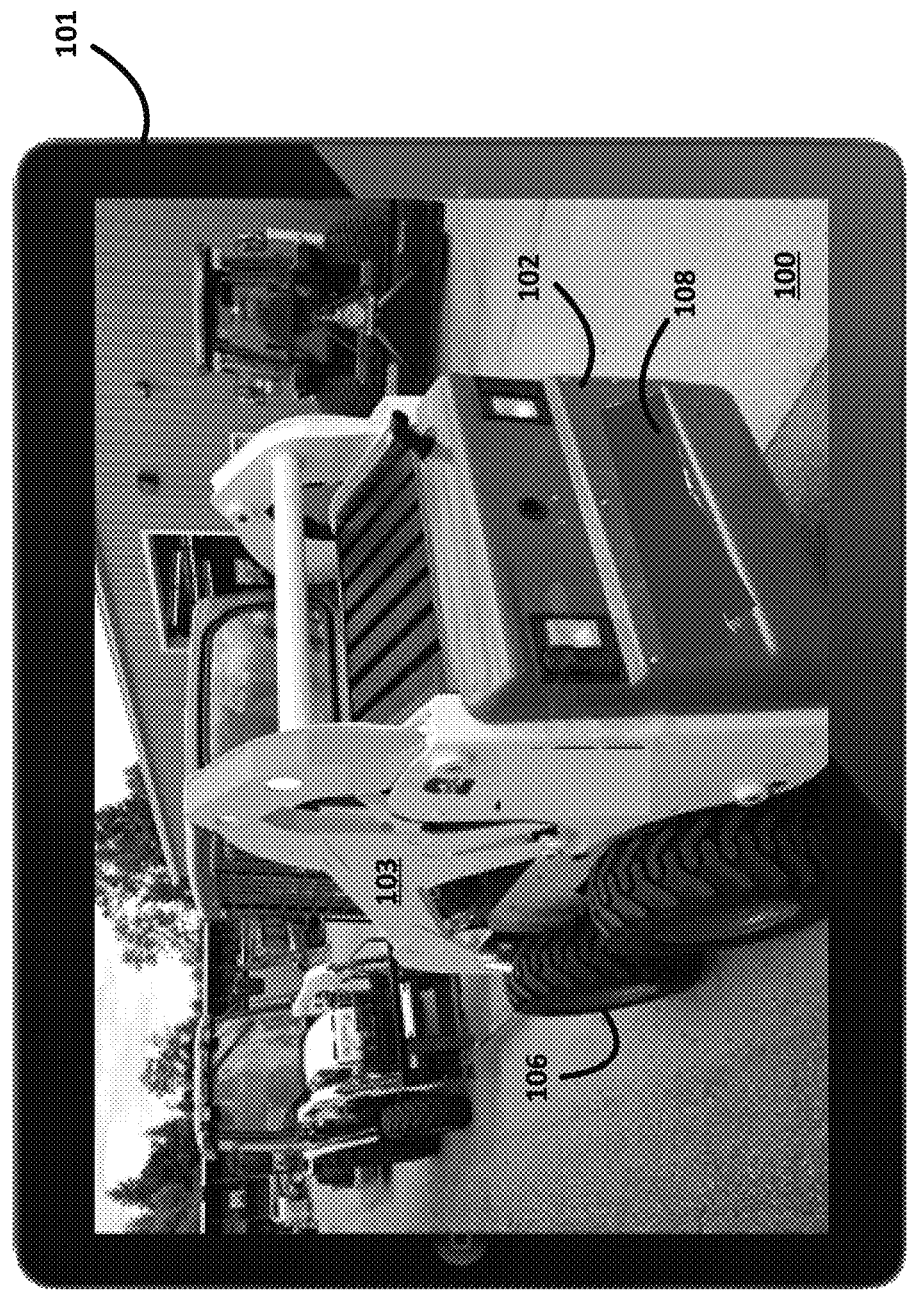
FIG. 1 is an diagram of a display screen showing example AR content.

Described herein are example implementations of an augmented reality (AR) system. In some examples, AR content is generated by superimposing computer-generated content onto actual graphics, such as an image or video of a real-life object. Any appropriate computer-generated content may be used including, but not limited to, computer graphics, computer animation, and computer-generated text.

In the example AR system, the actual graphic, such as an image or video of an object is stored in computer memory. A location, such as the position and orientation, of the device that captured the image is also stored. A graphical model, such as the digital twin described below, is mapped to the object in the image, and is used to generate content following capture and storage of the image. For example, at some time after capture and storage, a computing device in the AR system may receive a command from a user or other system to access the image, to replay a video of which the image is part, to obtain information about the object in the image, or take any other appropriate action. One or more processes executing in the AR system may then generate AR content based on the image, a location of the device, the action, and information in the graphical model that represents the object.

By way of example, a technician may capture a video of an object, such as a printer, by walking around the printer with a video camera in-hand. The video—comprised of sequential image frames—is stored in computer memory. The printer in the video is recognized using one or more appropriate computer vision techniques. The recognition may include identifying the location of the video camera that captured the video, including its position and orientation relative to the printer, and storing that information in computer memory. A graphical model containing information about the printer is mapped to the printer in the video, as described herein. The mapping may include associating information in the graphical model to corresponding parts of the printer, and storing those associations in memory. The resulting mapping enables the information from the graphical model to be used to augment the video of the printer. For example, the information may represent computer graphics that may be overlaid on the printer during presentation of the video. The computer graphics may display interior components of the printer, exterior components of the printer, readings or text relating to the operation of the printer, and so forth. Any appropriate information may be displayed.

Because the video, the location of the video camera during capture, and the graphical model are stored in computer memory, video or individual images of the printer may be accessed, augmented, and presented at any time following image capture. For example, video of the printer may be presented to a user at a time after the video was captured, and may be replayed to identify information about the printer even after the technician has left the vicinity of the printer. In some implementations, the printer may be connected to a network, and may include sensors associated with one or more of its components. Information from the sensors—e.g., sensor readings—may be incorporated into the graphical model in real-time. Accordingly, even after the technician has left the vicinity of the printer, the technician may use the video and the graphical model to obtain current information about the printer. For example, the technician may replay the video, which may be augmented with current sensor readings, such as an out-of-paper indication or a paper blockage indication. The technician may use the video and the graphical model, remotely or in the vicinity of the printer, to identify locations of any problem, to diagnose the problem, to repair the problem, and/or to discuss, over any communications medium, repair with a third party in the vicinity of the printer.

In some implementations, one or more image capture devices may be located in the vicinity of the object. These image capture devices may send information to the AR system to augment the original video or image. For example, the object—also referred to as the subject—may be a beach. The image capture devices may capture images of the water, and send those images to the AR system. The images of the water may be correlated to the original image or video and may be used to augment the original image or video to identify a current location of the water. This information may be augmented, as appropriate, with information from the graphical model, such as a prior or current temperature of the water, current or predicted future weather conditions at the beach, and so forth, as appropriate.

In some implementations, actions may be taken with respect to stored video. For example, stored video may be presented, and a user may select a part of an object in the video. In response to the selection, information about an object in the image may be presented including, for example, current sensor information, components interior to the selected part, and so forth.

Referring to FIG. 1, example AR content 100 is shown on the display of tablet computing device 101. In this example, AR content 100 includes an image of a loader 102 and computer graphics 103 that are rendered at an appropriate location over the image of the loader. The image was captured by a camera or other appropriate image capture device. The computer graphics were generated by a computing device, such as a remote server or the tablet computing device, based on information about the object displayed (the loader). As described herein, the computer graphics may relate to the object in some way. For example, in FIG. 1, computer graphics 103 highlight a part of the loader, namely its arm.

The example AR system described herein is configured to identify an object in an image captured by an image capture device, and to map a three-dimensional (3D) graphical model to the image of the object. In an example, the 3D graphical model contains information about the object, such as the object's structure, current or past status, and operational capabilities. The mapping of the 3D graphical model to the image associates this information from the 3D graphical model with the image. As a result of this mapping, an action may be taken with respect to the image currently or at a later date. More specifically, as described, the image (which may be part of a video), the location of the image capture device during capture, and associations to the 3D graphical model are stored in computer memory, and may be used to access the image or any appropriate content at a later date. For example, a stored video may be accessed and played on a computing device. Information from the 3D graphical model may be accessed and retrieved to augment the video.

In some cases, the information may include past or present sensor readings and, in some cases, updates to the 3D graphical model may require further mapping to the video. In some cases, the information may include past or present sensor locations. In an example that includes playing stored video, a point on the image may be selected, and information from the 3D graphical model relating to that point may be retrieved and used to display computer-generated content on the image. In an example, a computer graphics rendering of a selected object part may be displayed, as is the case with the arm of FIG. 1. In another example, text associated with the selected part may be displayed. In the example AR system, the 3D graphical model is controlled to track relative movement of the image capture device and the object in stored images or video. That is, the image capture device may move relative to the object, or vice versa, during image or video capture. During that movement in the stored images or video, the 3D graphical model also tracks the relative movement of the object even as the perspective of the object in the image changes vis-à-vis the image capture device. As a result, the example AR system enables interaction with the object from any appropriate orientation.

In the AR system, each instance of an object, such as loader 102, has a digital twin (DT), which is described below. An instance of an object (or object instance) includes a unique specimen of an object that is differentiated from other specimens of the object. For example, a loader may have a vehicle identification (ID) number that distinguishes it from all other loaders, including those that are the same make and model. Different types of information may be used to identify the instance of an object, as described herein. A DT is specific to an object instance and, as such, includes information identifying the object instance. In some implementations, there may be a single DT for each corresponding object instance. As used herein, an object is not limited to an individual article, but rather may include, e.g., any appropriate apparatus, system, software, structure, entity, or combination of one or more of these, that can be modeled using one or more DTs.

In this regard, a DT is an example of a type of 3D graphical model that is usable with the AR system; however, other appropriate models may also be usable. An example DT includes a computer-generated representation of an object comprised of information that models the object (referred to as the physical twin, or PT) or portions thereof. The DT includes data for a 3D graphical model of the object and associates information about the object to information representing the object in the 3D graphical model. For example, the DT may include, but is not limited to, data representing the structure of the object or its parts, the operational capabilities of the object or its parts, and the state(s) of the object or its parts. In some implementations, a DT may be comprised of multiple DTs. For example, there may be separate DT for each part of an object. In some examples, a part of an object may include any appropriate component, element, portion, section, or other constituent of an object, or combination thereof.

A DT may be generated based on design data, manufacturing data, and/or any other appropriate information (e.g., product specifications) about the object. This information may be generic to all such objects. In the loader example of FIG. 1, the DT may be generated using data that describes the structure and operational capabilities of the type (e.g., make and model) of the loader shown. This data may be obtained from any appropriate public or private database(s), assuming permissions have been granted. For example, the DT may be generated using information obtained from, and/or are managed by, systems such as, but not limited to, PLM (product lifecycle management) systems, CAD (computer-aided design) systems, SLM (service level management) systems, ALM (application lifecycle management) systems, CPM (connected product management) systems, ERP (enterprise resource planning) systems, CRM (customer relationship management) systems, and/or EAM (enterprise asset management) systems. The information can cover a range of characteristics stored, e.g., in a bill of material (BOM) associated with the object (e.g., an EBOM—engineering BOM, an MBOM—manufacturing BOM, or an SBOM—service BOM), the object's service data and manuals, the object's behavior under various conditions, the object's relationship to other object(s) and artifacts connected to the object, and software that manages, monitors, and/or calculates the object's conditions and operations in different operating environments.

The DT may also be generated based on sensor data that is obtained for the particular instance of the object. For example, the sensor data may be obtained from readings taken from sensors placed on, or near, the actual instance of the object (e.g., loader 102). In this example, since that sensor data is unique to loader 102, the DT for loader 102 will be unique relative to DTs for other loaders, including those that are identical in structure and function to loader 102. The DT may also include other information that is unique to the object, such as the object's repair history, its operational history, damage to the object, and so forth. In some implementations, the DT may be updated periodically, intermittently, in response to changes in sensor readings, or at any appropriate time. Updates to the DT may be incorporated into the DT, where appropriate, and used to augment an image, such as the loader of FIG. 1. In the case of loader 102, video showing operation of the loader may be captured and stored. Following capture and recognition of the loader, a DT may be associated with the loader. Sensors on the loader (not shown) may be used to monitor information such as fuel level, tire wear, and so forth. Values for such information may be received by the AR system from the sensors, and may update the DT for the loader. Accordingly, when the video of the loader is played at a future date (e.g., at some point in time after its capture), information from the sensors may be used to augment images in the video. The sensor information may be received in real-time or at least at some point following the initial capture and storage of the video. Accordingly, even though the video may have been captured at some point in the past, the sensor information may be current or more up-to-date than any information obtained at the time the image was captured. As a result, the stored video may be used both to access, from the DT, information about the structure of the loader and information about its current status. Thus, in some implementations, the video may be played to recreate a scene at the time video or imagery was captured, and to augment that scene with current information. In some implementations, sensor or other data may be extrapolated or generated based on current or past data to predict future information. This future information may be incorporated into imagery or video, as appropriate.

In some implementations, the updates may include updated imagery. For example, updates to the original image or object obtained using on-location or other cameras may be received following original image capture. These updates may be incorporated into the DT, and used to augment the original image. For example, in the beach case described above, current video of water in a static image may be received, and that video may be incorporated into the image's DT, and used to augment the image. Thus, the original static image may, by virtue of the augmentation, show flowing water. That is, the original static image may have a video component that reflects the current, and changing state of the water, as opposed to the originally-captured image of the water. This is an example of AR content that is generated from real-life, or actual video content only, rather than from an actual image and computer-generated imagery. AR content such as this may be augmented with computer-generated imagery, e.g., to show the temperature of the water, current or predicted temperature of the air, the time, and so forth.

Thus, the DT for an object instance may have numerous uses including, but not limited to, generating AR content for display. For example, the example AR system described herein may superimpose computer-generated content that is based on, or represents, the DT or portions thereof onto an image of an object instance. Example processes performed by the AR system identify an instance of the object, generate AR content for the object using the DT for that object, and use that AR content in various ways to enable access to information about the object.

Figure 2:
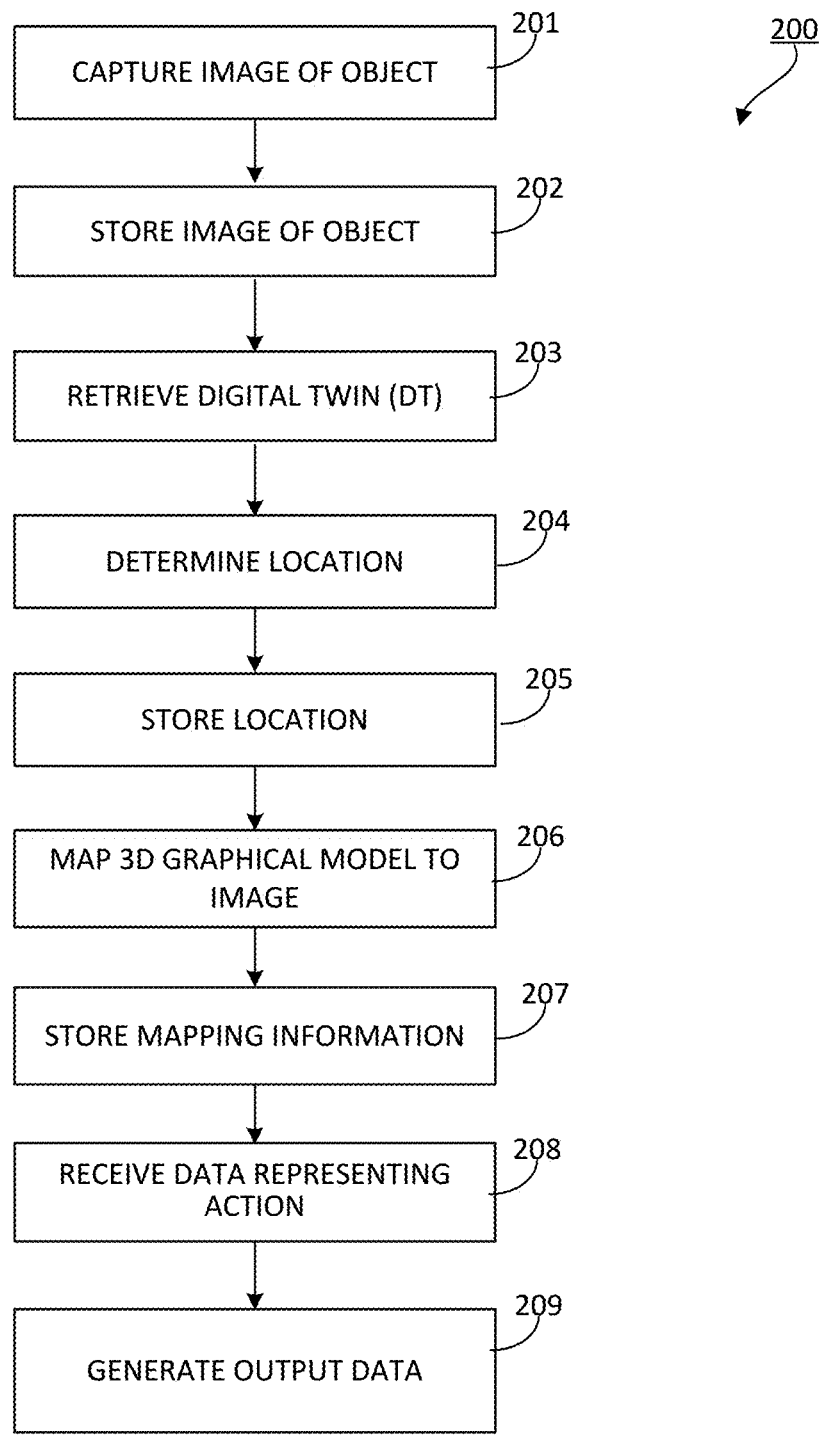
FIG. 2 is a flowchart of an example process for generating AR content.

An example process 200 that uses the DT to augment actual graphics, such as images or video, is shown in FIG. 2. Example process 200 may be performed by the AR system described herein using any appropriate hardware.

According to process 200, an image of an object is captured (201) by an image capture device—a camera in this example—during relative motion between the device and the object. As noted, the object may be any appropriate apparatus, system, structure, entity, or combination of one or more of these that can be captured in an image. An example of an object is loader 102 of FIG. 1. The camera that captures the image may be a still camera or a video camera. The camera may be part of a mobile computing device, such as a tablet computer or a smartphone. Data representing the image is stored (202) in computer memory. In the case of video, the image may be one frame of multiple frames that comprise the video.

Figure 9:
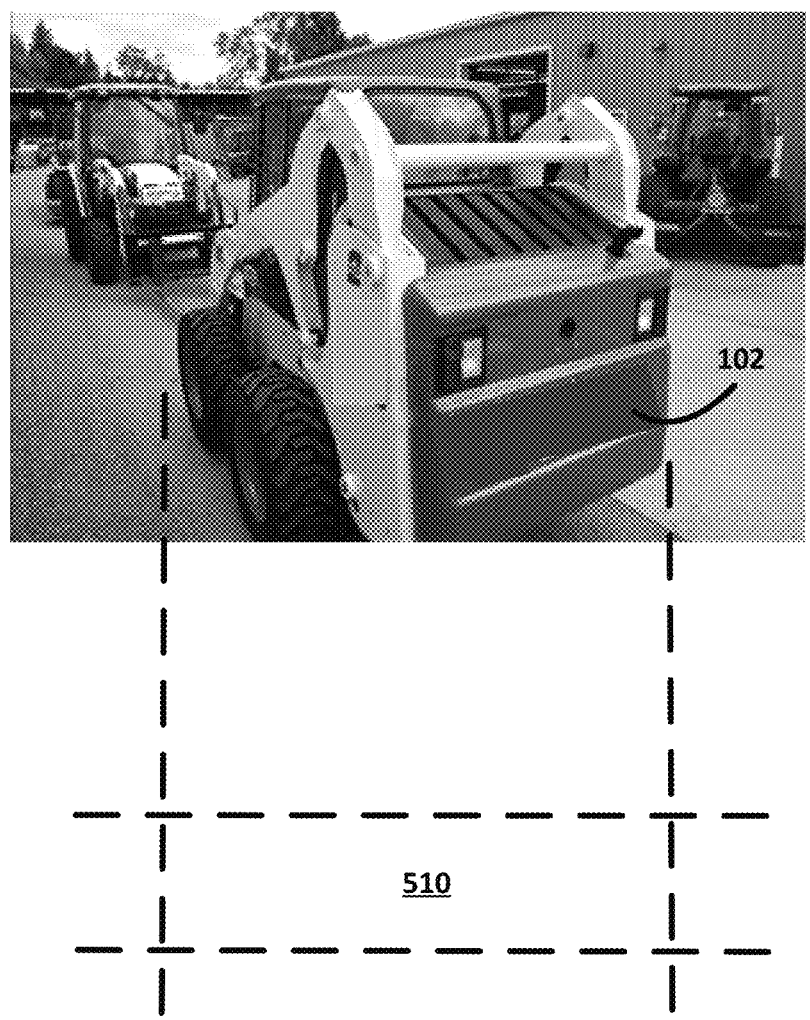
FIG. 9 is a diagram showing a field in which an image is to be captured.

In some implementations, process 200 requires that the camera be within a predefined location relative to the object during image capture. For example, as shown in FIG. 9, in order to determine the location of an object relative to the camera as described below, in some implementations, the camera needs to be within a predefined field of view (represented by a rectangle 510 defined by intersecting sets of parallel lines) relative to the object when the image is captured. In some implementations, recognition may be performed regardless of where the camera is positioned during image capture. Because the camera is within the predefined location, the location(s) of components of the object may be estimated, and information from those parts may be used in determining the location of the object in the image. For example, in some implementations, image marker-based tracking may be used to identify the location based on is image artifacts, or other active scanning techniques to scan and construct a 3D map of the environment, from which location can be determined. Using this tracking ability, and identifying information as described below, a DT can be associated with the object.

In some implementations, the relative motion between the camera and the object includes the object remaining stationary while the camera moves. In some implementations, the relative motion between the camera and the object includes the object moving while the camera remains stationary. In some implementations, the relative motion between the camera and the object includes both the object and the camera moving. In any case, the relative motion is evident by the object occupying, in different images, different locations in the image frame. Multiple images may be captured and stored (202) during relative motion and, as described below, a DT may be mapped to (e.g., associated with) the object in each image. As described below, in some implementations, the DT may track motion of the object, thereby allowing for interaction with the object via an image from different perspectives in the stored video. In some implementations, real-time information may be received from an object (or subject) of the image, and that information may be incorporated into the DT in real-time and used to augment stored video. In this regard, in some implementations, real-time may not mean that two actions are simultaneous, but rather may include actions that occur on a continuous basis or track each other in time, taking into account delays associated with processing, data transmission, hardware, and the like.

Figure 3:
FIG. 3 is an diagram of a display screen showing example AR content.

In an example, tablet computer 101 may be used to capture the image of loader 102 at a first time, $T_1$. For example, the image may be part of a video stream comprised of frames of images that are captured by walking around the loader. In another example, the image may be part of a video stream comprised of frames of images that are captured while the camera is stationary but the loader moves. Referring also to FIG. 3, in this example, the tablet computer 101 may be used to capture a different image of loader 102 at a second, different time, $T_2$. As is clear from FIGS. 1 and 3, the two images were taken from different perspectives.

Referring back to FIG. 2, process 200 identifies the object instance in the captured image and retrieves (203) a DT for the object instance—in the example of FIG. 1, loader 102. In this regard, any appropriate identifying information may be used to identify the object instance. The identifying information may be obtained from the object itself, from the image of the object, from a database, or from any other appropriate source. For example, the identifying information may be, or include, any combination of unique or semi-unique identifiers, such as a Bluetooth address, a media access control (MAC) address, an Internet Protocol (IP) address, a serial number, a quick response (QR) code or other type of bar code, a subnet address, a subscriber identification module (SIM), or the like. Tags, such as RFIDs, may be used for identification. For objects that do not move, the identifying information may be, or include, global positioning system (GPS) or other coordinates that defines the location of the object. For objects that do not include intelligence or other specific identifiers (like bar codes or readable serial numbers), unique features of the object in the image may be used to identify the object instance. For example, a database may store information identifying markings, wear, damage, image artifacts as described above, or other distinctive features of an object instance, together with a unique identifier for the object. The AR system may compare information from the captured image to the stored information or a stored image. Comparison may be performed on a mobile device or on a remote computer. The result of the comparison may identify the object. After the object is identified, the DT for that object may be located (e.g., in memory, a location on a network, or elsewhere) using the obtained object identifier. The DT corresponding to that identifier may be retrieved (203) for use by process 200.

Process 200 determines (204) a location of the camera relative to the object during image capture. The location of the camera relative to the object can be specified, for example, by the distance between the camera and the object as well as the relative orientations of the camera and object. Other determinants of the relative location of the camera and the object, however, can be used. For example, the relative locations can be determined using known computer vision techniques for object recognition and tracking. The location may be updated periodically or intermittently when relative motion between the object and the camera is detected. For each image—including a frame of video—the location of the camera relative to the object, as determined herein, is stored (205) in computer memory. The stored information may be used, as described herein, to implement or update mapping of the DT to the object in the image based on movement of the object.

In some implementations, location may be determined based on one or more attributes of the object in the stored image and based on information in the DT for the object. For example, a size of the object in the image—e.g., a length and/or width taken relative to appropriate reference points—may be determined. For example, in the image, the object may be five centimeters tall. Information in the DT specifies the actual size of the object in the real-world with one or more of the same dimensions as in the image. For example, in the real-world, the object may be three meters tall. In an example implementation, knowing the size of the object in the image and the size of the object in the real world, it is possible to determine the distance between the camera and the object when the image was captured. This distance is one aspect of the location of the camera.

In some implementations, the distance between the between the camera and the object is determined relative to a predefined reference point on the camera, rather than relative to a lens used to capture the image. For example, taking the case of some smartphones, the camera used to capture images is typically in an upper corner of the smartphone. Obtaining the distance relative to a predefined reference, such as a center point, on the smartphone may provide for greater accuracy in determining the location. Accordingly, when determining the distance, the offset between the predefined reference and the camera on the smartphone may be taken into account, and the distance may be corrected based on this offset.

The location of the camera relative to the object is also based on the orientation of the object relative to the camera during image capture. In an example implementation, to identify the orientation, process 200 identifies one or more features of the object in the stored image, such as wheel 106 in the loader of FIG. 1. Such features may be identified based on the content of the image. In an example, a change in pixel color may be indicative of a feature of an object. In another example, the change in pixel color may be averaged or otherwise processed over a distance before a feature of the object is confirmed. In another example, sets of pixels of the image may be compared to known images in order to identify features. Any appropriate feature identification process may be used.

The orientation of the object in the image relative to the camera may be determined based on the features of the object identified in the image. For example, the features may be compared to features represented by 3D graphics data in the DT. To make the comparison, one or more 3D features from the DT may be projected into two-dimensional (2D) space, and their resulting 2D projections may be compared to one or more features of the object identified in the image. Features of the object from the image and the 3D graphical model (from the DT) that match are aligned. That is, the 3D graphical model is oriented in 3D coordinate space so that its features align to identified features of the image. In a state of alignment with the object in the image, the 3D graphical model may be at specified angle(s) relative to axes in the 3D coordinate space. These angles(s) define the orientation of the 3D graphical model and, thus, also define the orientation of the object in the image relative to the camera that captured the image. Other appropriate methods of identifying the orientation of the object in the image may also be used, or may be used on conjunction with those described herein. As noted, the location (e.g., position and orientation) of the camera relative to the object is stored (205). In the case of video, which is comprised of multiple image frames in sequence, the location of the camera is stored for each image frame.

Figure 4:
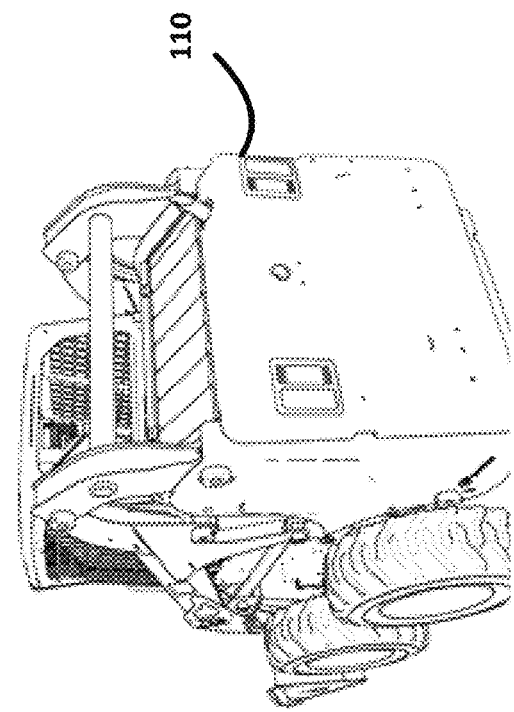
FIG. 4 is a diagram showing a representation of an object produced using three-dimensional (3D) graphic data next to an image of the object.
Figure 4:

Process 200 maps (206) the 3D graphical model defined by the DT to the object in the image based, at least in part, on the determined (204) location of the camera relative to the object. As explained above, the location may include the distance between the object in the image and the camera that captured the image, and an orientation of the object relative to the camera that captured the image. Other factors than these may also be used to specify the location. In some implementations, mapping may include associating data from the DT, such as 3D graphics data and text, with corresponding parts of the object in the image. In the example of loader 102 of FIG. 1, data from the DT relating to its arm (covered by graphics 103) may be associated with the arm; data from the DT relating to front-end 108 may be associated with front-end 108; and so forth. In this example, the associating process may include storing pointers or other constructs that relate data from the DT with corresponding pixels in the image of the object. This association may further identify where, in the image, data from the DT is to be rendered when generating AR content. In the example of the loader of FIG. 1, data from the DT—such as 3D graphics or text—is mapped to the image. FIG. 4 shows, conceptually, 3D graphics 110 for the loader beside an actual image 112 of the loader. In the AR system described herein, the DT comprising the 3D graphics data may be stored in association with the image of the loader, as described above, and that association may be used in obtaining information about the loader from the image.

Furthermore, because data in the DT relates features of the object in 3D, using the DT and the image of the object, it is also possible to position 3D graphics for objects that are not visible in the image at appropriate locations. More specifically, in the example of FIG. 4 above, because image 112 is 2D, only a projection of the object into 2D space is visible. Using the techniques described herein, data—e.g., 3D graphics data—from the DT is associated with the image of the object in 2D. However, the DT specifies the entire structure of the object using 3D graphics data. Accordingly, by knowing where some of the 3D graphics data fits relative to the object (i.e., where the 3D data fits relative to parts of the object that are visible in the image), it is possible to appropriately position the remaining 3D graphics for the object, including for parts of the object that are not visible or shown in the image. Implementations employing these features are described below.

The location of the camera relative to the object may change in the stored video as the relative positions between the object and the camera change. For example, the camera may be controlled to capture video of the object moving; the camera may be moved and capture video while the object remains stationary; or both the camera and the object may move while the camera captures video. Referring to FIGS. 1 and 3, for example, the loader may move from the position shown in FIG. 1 to the position shown in FIG. 3. During the resulting relative movement, the AR system may be configured so that the DT—e g., 3D graphics data and information defined by the DT—tracks that relative movement. That is, the DT may be moved so that appropriate content from the DT tracks corresponding features of the moving object. In some implementations, the DT may be moved continuously with the object in the stored video by adjusting the associations between data representing the object in an image frame and data representing the same parts of the object in the DT. For example, if a part of the object moves to coordinate XY in an image frame of video, the AR system may adjust the association between the DT and the image to reflect that data representing the moved part in the DT is also associated with coordinate XY. In some implementations, movement of the object can predict its future location in a series of images— e.g., in frame-by-frame video—and the associations between DT data and image data may be adjusted to maintain correspondence between parts of the object in the image and their counterparts in the DT. Take arm 113 of FIG. 3 as an example. In this example, movement of the camera may result in relative motion of arm 113 in the image frame. Movement in one direction may be a factor in determining future movement of the object in that same direction. The system may therefore predict how to adjust the associations for future movement in the video based on the prior movement.

In some implementations, a 3D graphical model representing the object and stored as part of the DT is mapped to each image, e.g., in a video sequence, and information representing the mappings is stored (207) in computer memory. For example, in some implementations, information, as described herein, mapping the 3D graphical model is stored for each image, and that information is retrievable and usable to generate AR content for the image at any appropriate time. In an example, the video and mapping information may be stored at an initial time, and the video and mappings may be used at any point following the initial time to generated AR content using the video and information from the DT resulting from the mapping. In some implementations, the location, including the position and orientation, of the image capture device may be stored for each image. For stored video, mapping may be performed dynamically using the stored location. For example, as an image is retrieved from storage, stored location information for the image capture device is also retrieved. That stored location information is used, together with any other appropriate information, to map a 3D graphical model of the object from the object's DT to the image in the manner described herein. Each time the image changes, as is the case for video, that mapping process may be performed or updated.

In this regard, the mapping of the DT to the object associates attributes in the DT with the object. This applies not only to the object as a whole, but rather to any parts of the object for which the DT contains information. Included within the information about the object is information about whether individual parts of the object are selectable individually or as a group. In some implementations, to be selectable, a part may be separately defined within the DT and information, including 3D graphics, for the part, may be separately retrievable in response to an input, such as user or programmatic selection. In some implementations, selectability of a part may be based on or more or more additional or other criteria.

In some implementations, a user interface may be generated to configure information in the DT to indicate which of the parts are selectable and which of the parts are selectable individually or as a group. In this regard, in some implementations, a DT may be generated at the time that the PT (object) is created. For example, the AR system may obtain, via a user interface, information indicating that an object having a given configuration and a given serial number has been manufactured. In response to appropriate instructions, the AR system may create, or tag, a DT for the object based on information such as that described herein. Operational information about the instance of the object may not be available prior its use; however, that information can be incorporated into the DT as the information is obtained. For example, sensors on the (actual, real-world) object may be a source of operational information that can be relayed to the DT as that information is obtained. A user may also specify in the DT, through the user interface, which parts of the object are selectable, either individually or as a group. This specification may be implemented by storing appropriate data, such as a tag or other identifier(s), in association with data representing the part.

Referring back to FIG. 2, following storage, process 200 receives (208) data representing an action to be performed with respect to the stored video. In response to this received data, data is generated (209) for use in rending content on a display device. In this example, the generated data is based on one or more of: the stored image, the stored location of the image capture device, at least some information from the retrieved DT, or the action to be taken. For example, the action to be performed may include replaying video from a prior point in time, and augmenting that video with 3D graphics at selected points in the video or where otherwise appropriate. In this example, the video may be retrieved and played from the perspective of the image capture device. This perspective is quantified using information identifying the location of the image capture device relative to an object in the video.

In response to an action, such as selecting part of the image as described below, 3D graphics for the selected part may be retrieved from the object's DT. As noted, in some implementations, mapping information for each frame of video is stored. In this case, that mapping information may be used to correlate the 3D graphics to the corresponding part of the image, and may be used to generate AR content that includes the image and 3D graphics. In some implementations, the location (e.g., position and orientation) of the image capture device may be stored for each image, including for frames of video. Accordingly, in some implementations, the mapping process may be performed dynamically as each image is retrieved. For example, rather than performing mapping beforehand and storing the mapping information in memory, as each frame of video is played, mapping may be performed. Performing mapping dynamically may have advantages in cases where an objects DT changes over time. In some implementations, the mapping may be performed using a combination of stored mapping information and dynamic mapping. For example, parts of an object that do not change may be mapped beforehand and mapping information therefor stored. Other parts of the object that do change, and for which the DT may change over time, may be mapped dynamically.

In operation 208, any appropriate action may be taken. For example, the data may represent an instruction to play the video, to move to a particular image in the video, to display 3D graphical content for all or part of the video, to identify updated sensor information for parts of an object shown in the video, to access to the object's BOM, to access the object's service history, to access the object's operating history, to access the object's current operating conditions, to generate data based on determined sensor values, and so forth. In an example, the data may represent a selection of a point on an image that represents the part of the object. The selection may include a user-initiated selection, a programmatic selection, or any other type of selection. For example, as shown in FIG. 1, a user may select a point in the image that corresponds to the loader 102 by touching the image at an appropriate point. Data for the resulting selection is sent to the AR system, where that data is identified as representing a selection of a particular object or part on the loader represented in the image. The selection may trigger display of information.

In some implementations, instead of or in addition to the user selecting a point of the image by touching a screen or selecting with a pointer, the user interface showing the object can be augmented with a set of visual crosshairs or a target that can remain stationary, such as in the center, relative to the user interface (not illustrated). The user can select a part of the object by manipulating the crosshairs such that the target points to any point of interest on the object. The process 200 can be configured to continually and/or repeatedly analyze the point in the image under the target to identify any part or parts of the object that correspond to the point under the target. In some implementations, the target can be configured to be movable within the user interface by the user, and/or the process can be configured to analyze a point under the target for detection of a part of the object upon active user input, such as a keyboard or mouse click.

In an example, in some implementations, the point selected is identified by the system, and information in the DT relating to an object or part at that point is identified. The user may be prompted, and specify, whether the part, a group of parts, or the entire object is being selected. The information is retrieved from the DT and is output for rendering on a graphical user interface as part of AR content that may contain all or part of the original image. In an example, 3D graphics data for the selected object or part in stored video or other storage imagery may be retrieved and rendered over all or part of the object or part. In an example, text data relating to the selected object or part may be retrieved and rendered proximate to the object or part. For example, the text may specify values of one or more operational parameters (e.g., temperature) or attributes (e.g., capabilities) of the part. In an example, both 3D graphics data and text data relating to the selected object or part may be retrieved and rendered with the object or part.

In some implementations, the resulting AR content may be used to control the object in the image using previously stored video or imagery. For example, the DT may be associated with the actual real-world object, e.g., through one or more computer networks. A user may interact with the displayed AR content to send data through the network to control or interrogate the object, among other things. Examples of user interaction with displayed AR content that may be employed herein are described in U.S. Patent Publication No. 2016/0328883 entitled "Augmented Reality System", which is incorporated herein by reference.

Any appropriate method may be used by the AR system to identify the object or part selected in stored video or imagery. In some implementations, ray tracing may be used to select the object or part. For example, as shown in FIG. 5A, example ray 302 (shown as a dashed line) radiates from within the field of view 301 of a camera 303 that captured the stored image or video and intersects a 2D image 306 of a loader at point 308. FIG. 5B shows a close-up of view of point 308. As shown conceptually in FIG. 5, the intersection point—in this case point 308 in image 306—also relates to a corresponding point 309 on the DT 310 associated with object 313. That is, point 308 of image 306 relates, via ray 302, to point 309 on DT 310. Selection of point 308 in image 306 thus results in selection of point 309 on DT 310. That is, selection of point 308 on image 306 may cause ray 302 to be projected from that point to, and through, the 3D graphical model defined by the DT 310. Parts of the object defined by the 3D graphical model are identified based on their intersection with ray 302. Notably, the ray is a mathematic and programmatic construct. The ray not a physical manifestation.

As noted, a ray may intersect, and travel through, a 3D graphical model defined by the DT. That is, because the image and DT are associated as described herein, the ray can be programmatically projected to, and through, appropriate locations on the 3D graphical model contained in the DT. Accordingly, any part or component that intersects the ray may be selectable, and data therefor retrievable to generate AR content. For example, ray 302 travels through DT 310. By passing through DT 310, ray 302 intersects the exterior of the object 313 and also one or more selectable parts that are interior to object 313. For example, referring to FIGS. 6A and 6B, ray 302 may intersect part 320 that is interior to the 3D graphical model of DT 310. This interior part may be selected, and rendered at an appropriate location as computer-generated graphics 320 on image 306, as shown in FIG. 6B. In some implementations computer-generated graphics 320 may be partially transparent or in outline form. That may be the case for any of the computer graphics generated herein for display as AR content on an image.

In some implementations, upon selection of a point on image 306, the user may be prompted with a list of all parts—both interior and exterior to object 313—that the ray intersects. For example, the prompt may be a pop-up box or any other appropriate type of computer graphic. The user may then select one or more of the parts. The selection may include the type of data to display for each part (e.g., 3D graphics, text, etc.) or that information may be determined as described herein based on the type of the selection. Corresponding identifiers for the selected parts are retrieved, and information for those selected parts is identified in the DT based on the identifiers. The system retrieves appropriate data for the selected part and outputs that data for rendering as AR content at appropriate positions on the original image. In some implementations, internal parts may be rendered in outline form or in different colors, with each different color reflecting a depth of the part within the object along a ray.

In some implementations, methods other than ray tracing may be used to identify parts that are selected. For example in some implementations different parts of an image may be rendered using different colored pixels. Selection of a part may be identified based on the pixel that is selected. Implementations such as this may employ a dual-buffer scheme comprised of a front buffer and a back buffer. A current image is viewed from the front buffer while a subsequent image is being drawn to the back buffer. At an appropriate time, the back buffer becomes the front buffer, and vice versa, so that the subsequent image can be viewed. In an example operation, an image is generated based on data written to the front buffer. Parts of that image are drawn in different colors into the back buffer. The parts may be distinguished, and identified, based on characteristics of the image, e.g., pixel transitions and the like. A user selects a part of the object in the image, and the colored part from the back buffer is identified corresponding to (e.g., at a same location as) the selection. The DT for the object is identified beforehand, as described herein. The selected color part is then compared to parts in the 3D graphical model for the object in order to identify the color part. Information from the DT may then be used to render graphical and/or textual content in association with the selected part. For example, a graphical overlay may be presented over the selected part or text from the DT may be displayed next to the part.

As explained above, the DT contains information indicating whether a part is selectable individually or as a group. In the example of FIG. 5, selection of a part 309 is interpreted by the AR system based on whether DT 310 indicates that part 309 is selectable, and based on whether part 309 is selectable individually or as a group. If the part is selectable, and selectable individually, then corresponding information from the DT is retrieved and output for rendering as AR content with the image. In some implementations, 3D computer graphics data may be output and rendered over the image so that the 3D graphics data overlays a corresponding part of the image. An example of this is the 3D graphics version of the loader arm overlaid on the images of FIGS. 1 and 3. In some implementations, text data may be output and rendered on the image so that the text is displayed over or alongside the image. In an example, the text can be rendered on the image alongside the part of interest, e.g. the loader arm. If the part is selectable, and selectable as a group, then information about the group is retrieved and output for rendering as AR content with the image. The information may be any appropriate type of information, such as 3D graphics, text, and so forth. As described herein, in some implementations, the user may be prompted to indicate whether a part, multiple parts, or an entire object is selected, in which case appropriate AR content is retrieved and displayed. In some implementations, the system may be configured to recognize certain actions as selecting a part, multiple parts, or an entire object.

In some implementations, different types of selections may trigger displays of different types of data. For example, the type of data displayed may be triggered based on the duration of a selection. For example, a first-duration selection (e.g., one that lasts for a first period of time) may trigger display of 3D graphics, a second-duration selection (e.g., one that lasts for a second period of time) may trigger display of text, and a third-duration selection (e.g., one that lasts for a third period of time) may trigger display of both 3D graphics and text. In some implementations, the type of selection may not be based on temporal considerations, but rather may be based on other factors. For example, if the selection is a swipe-type-touch, one type of data (e.g., 3D graphics) may be displayed, whereas if the selection is a tap-type-touch, a second type of data (e.g., text) may be displayed. The system may be configured to associate any appropriate type of selection with display of one or more appropriate types of data to generate AR content.

In the examples presented above, the AR system obtains the DT for an object and uses the DT to generate graphics or text to superimpose onto an image of an object. However, any appropriate content including, but not limited to, animation; video; and non-computer-generated images, video or text, may be obtained from a DT or elsewhere and superimposed onto an image to generate AR content. In some implementations, the AR content may include audio, computer-generated or real-life audio, that is displayed in conjunction with an image and/or graphics.

Referring back to operation 208, in some implementations, the data received (208) may represent a selection from a menu. For example, in some implementations, a menu may be displayed overlaid on the stored image or separate from the stored image. For example, the menu may be a drop-down menu or a pop-up menu that is triggered for display by selecting an appropriate area of the image. In any case, the menu may list, textually, parts contained in the object, including both those that are visible in the image and those that are not visible in the image (e.g., internal parts). For example, the object instance may be identified beforehand in the manner described herein, and a list of its selectable parts from the DT displayed on the menu. A user may select one of more of the listed parts. Data representing that selection is obtained by process 200, which uses that data to obtain information about the selected part from the object's DT. As described herein, the information may be used to generate AR content from the image and the information about the part. For example, as described, graphics—which may be, e.g., transparent, opaque, outline, or a combination thereof—may be retrieved from the DT for the object instance and displayed over the part selected. As described herein, other information, such as text, may also be displayed.

Referring back to operation 208, in some implementations, the data received (208) may represent a selection of computer-generated graphics that are displayed overlaid on the image. For example, in some implementations, the object instance displayed in the image may be identified beforehand in the manner described herein. Computer graphics from the DT for selectable parts of the object may be overlaid onto the image, as appropriate, or may be displayed separately. The computer graphics can be displayed in a partially transparent fashion such that both the overlaid computer graphics and the underlying image are visible to the user simultaneously. A user may select (208) one of more of the displayed parts by selecting (e.g., touching-on) the computer graphics displayed for that part. In some implementations, the computer graphics represents both internal and external parts of the object. As such, the computer graphics may be displayed using navigable layers, that may be reached, for selection, through interaction with one or more appropriate controls. For example, one or more layers containing internal object parts may be selected, and individual parts may be selected from that layer. Other methods may also be used for selecting internal parts. In any event, data representing the part selected is obtained by process 200, which uses that data to obtain information about the part from the object's DT. As described herein, the information may be used to generate AR content from the stored image and the information about the part. In this example, computer graphics (which may be, e.g., transparent, opaque, outline, or a combination thereof) for the selected part or parts may be retained, and remain overlaid on the image. The remaining computer graphics may be eliminated. As described herein, other information, such as text, may also be displayed based on the selection.

Referring back to operation 208, in some implementations, the data received (208) may represent a selection of computer-generated graphics that are displayed in a menu associated with the image. For example, in some implementations, a menu may be displayed overlaid on the image or separate from the image. As above, the menu may be a drop-down menu or a pop-up menu that is triggered for display by selecting an appropriate area of the image. In any case, the menu may show, graphically, parts contained in the object, including both those that are visible in the image and those that are not visible in the image (e.g., internal parts). For example, the object instance may be identified beforehand in the manner described herein, and computer graphics that represent its selectable parts displayed on the menu. A user may select one of more of the displayed parts. Data representing that selection is obtained by process 200, which uses that data to obtain information about the selected part from the object's DT. As described herein, the information may be used to generate AR content from the image and the information about the part. For example, as described, computer graphics (which may be, e.g., transparent, opaque, outline, or a combination thereof) may be retrieved from the DT for the object instance and displayed over the part selected. As described herein, other information, such as text, may also be displayed.

FIGS. 10 to 16 show examples of AR content that may be generated using stored imagery or video according to the example processes described herein. Although examples are presented, any appropriate content may be generated using the example processes described herein.

Figure 10:
FIGS. 10 to 16 show examples of AR content that may be generated using stored imagery or video using the example processes described herein.

FIG. 10 shows the results of an action taken with respect to stored image 511 of loader 102. In this example, the action is to display, on image 511, interior parts 512 of the loader and current sensor reading 513. As shown, the graphic depicting the current sensor reading is located near to the part read (e.g., the vent), and includes an arrow pointing to that part. A graphic such as this, or any other appropriate graphic, may be used to represent any sensor reading. The content augmenting the image is obtained from the loader's DT, as described herein.

Figure 11:
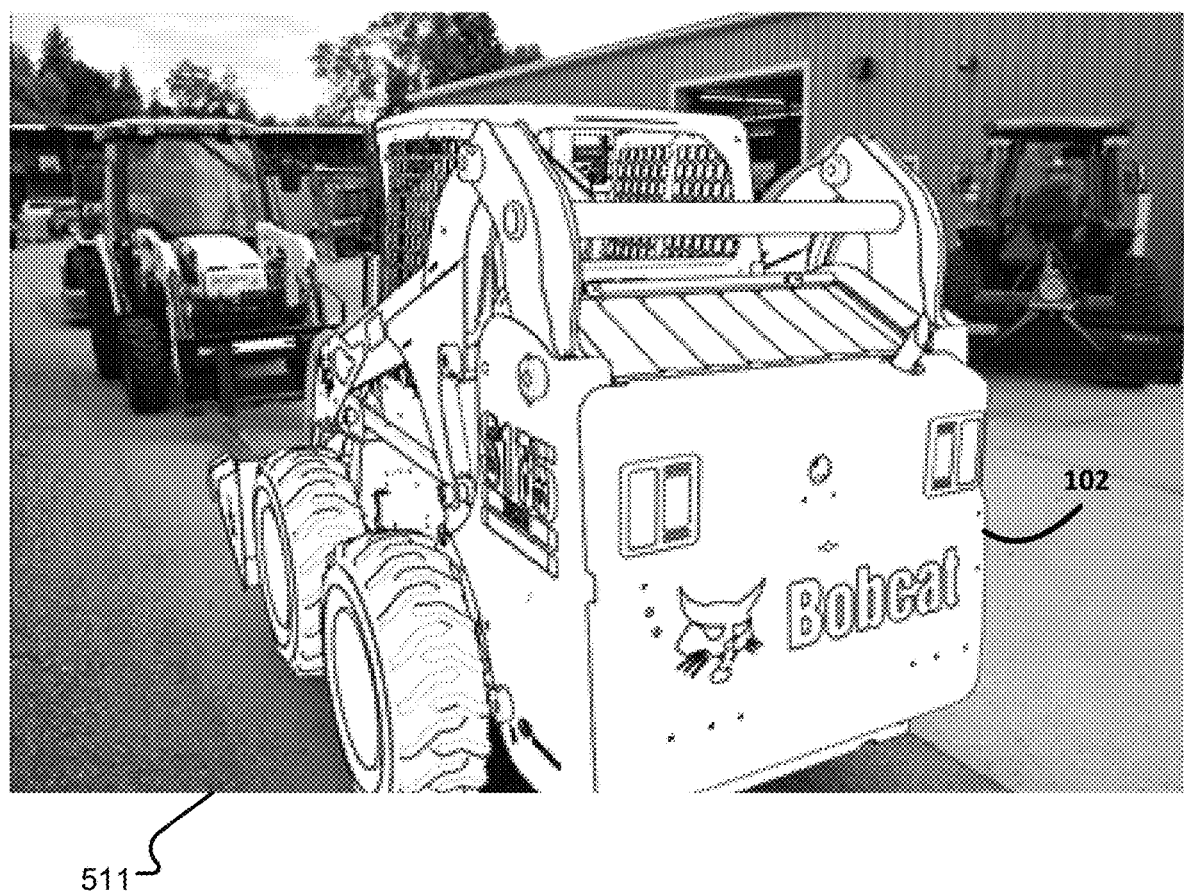

FIG. 11 shows the results of an action taken with respect to stored image 511 of loader 102. In this example, the action is to display, on image 511, the loader and its components in outline form. The content augmenting the image is obtained from the loader's DT, as described herein.

Figure 12:
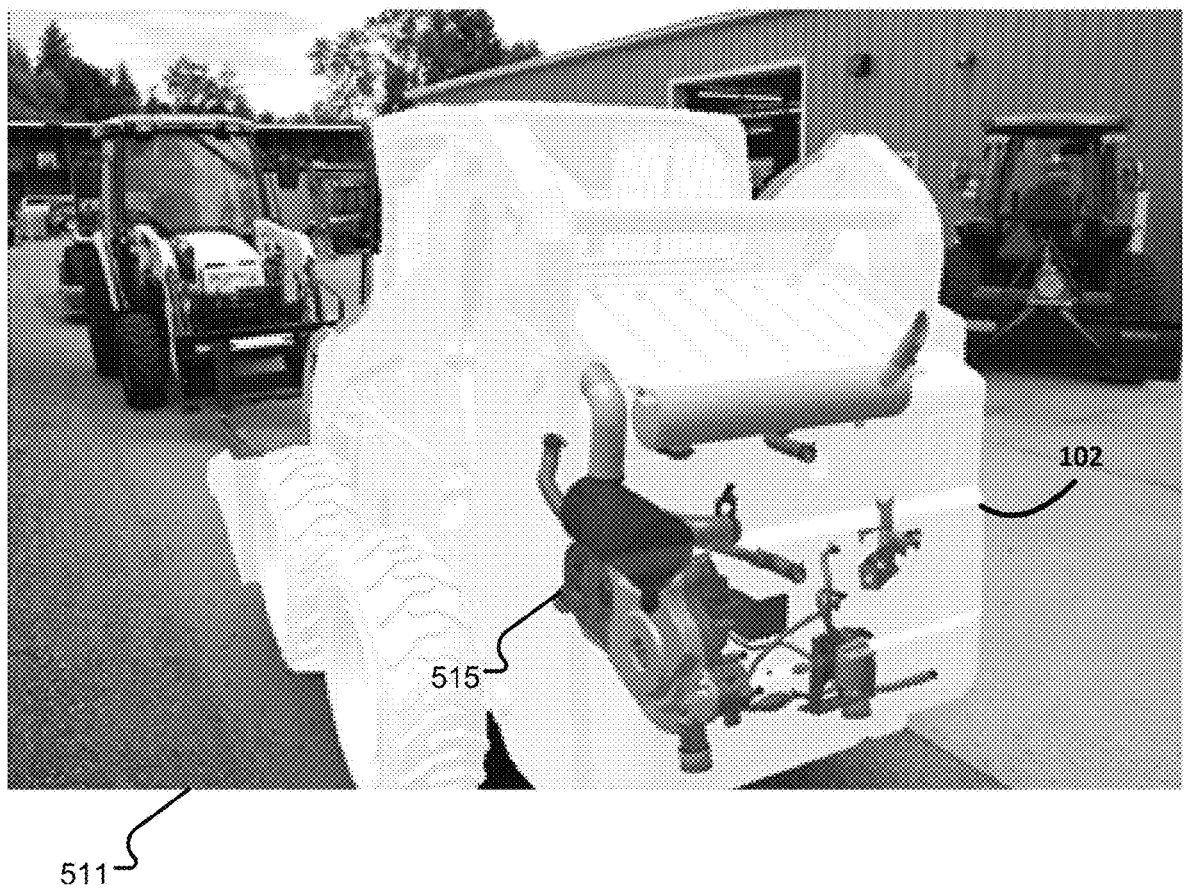

FIG. 12 shows the results of an action taken with respect to stored image 511 of loader 102. In this example, the action is to display, on image 511, the loader and its components in shadow form together with its interior parts 515 in color. The content augmenting the image is obtained from the loader's DT, as described herein.

Figure 13:
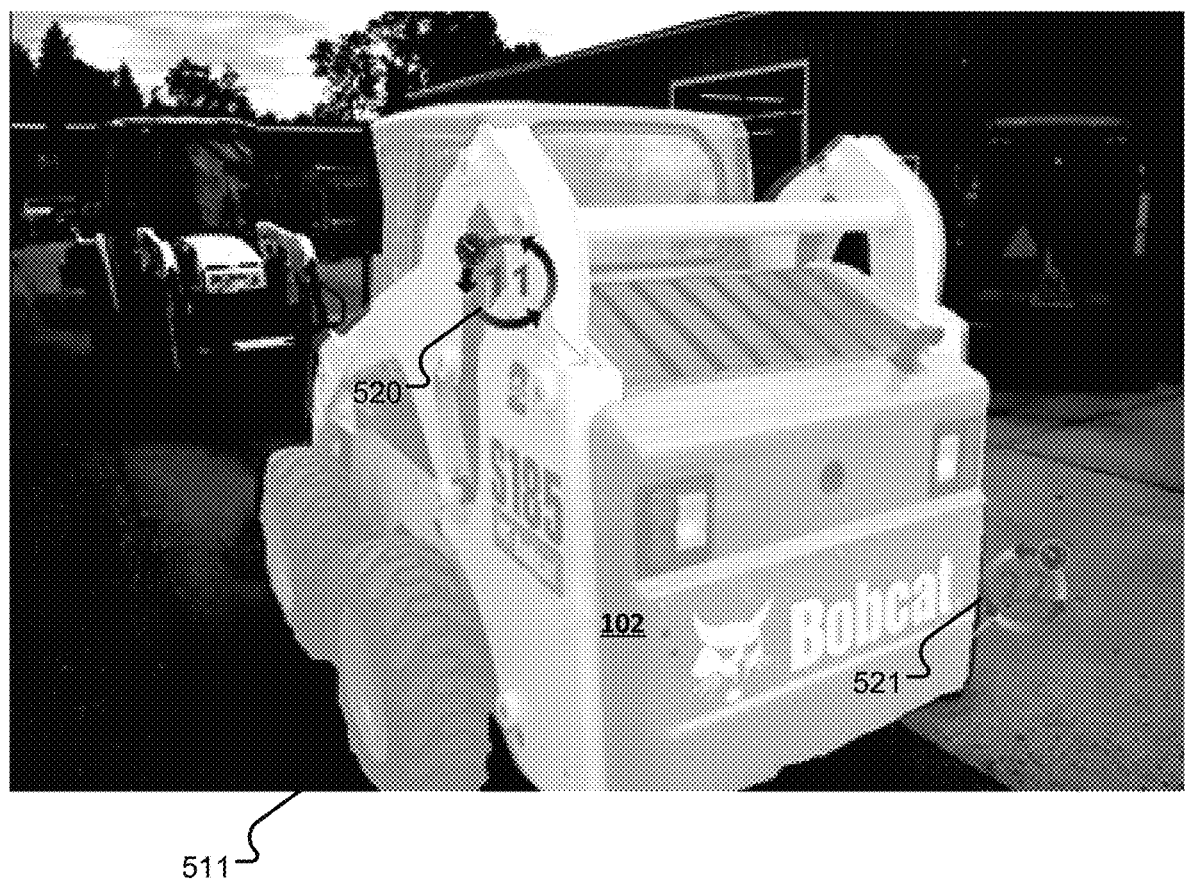

FIG. 13 shows the results of an action taken with respect to stored image 511 of loader 102. In this example, the action is to display, on image 511, the loader and its components in shadow form together with two sensor readings 520, 521. The content augmenting the image is obtained from the loader's DT, as described herein.

Figure 14:
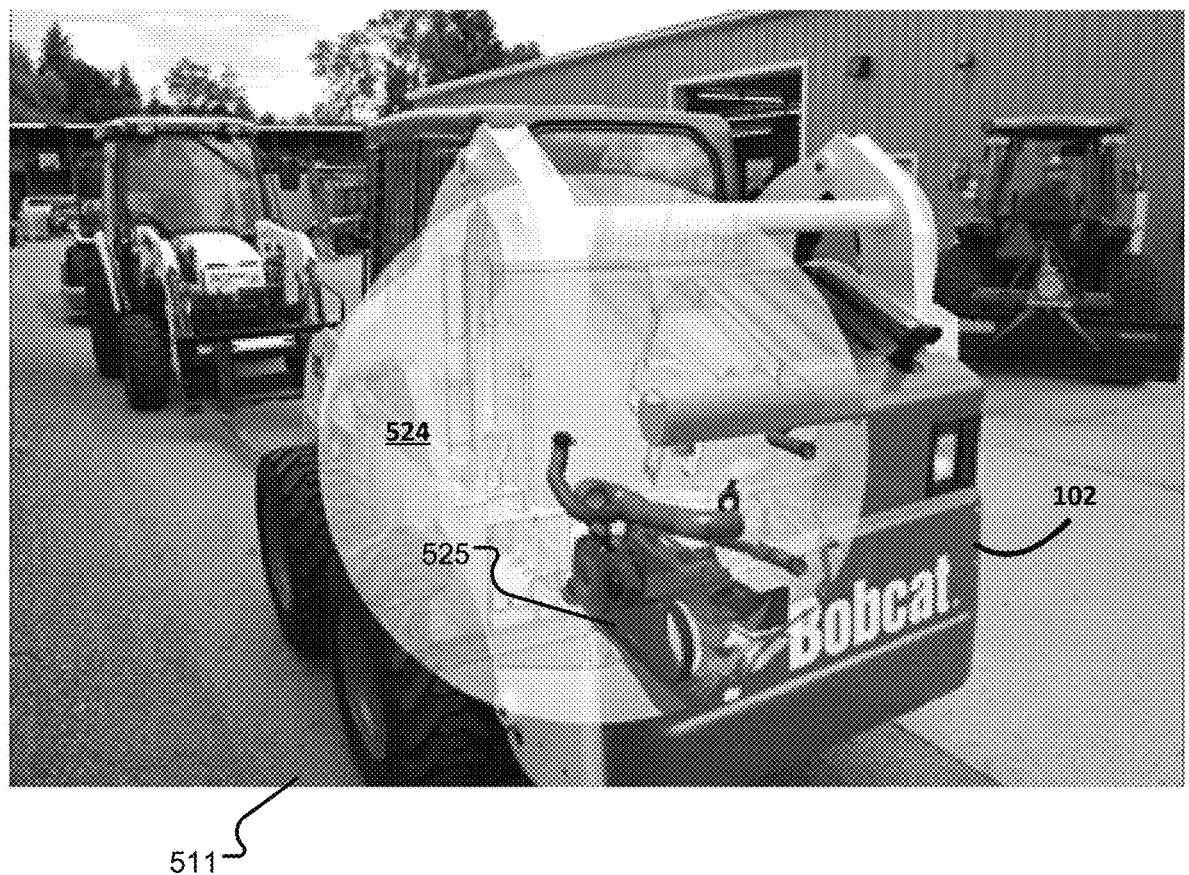

FIG. 14 shows the results of an action taken with respect to stored image 511 of loader 102. In this example, the action is to display, on image 511, a selected circular region 524 of the loader and components in that circular region in shadow form together with interior components 525 in that circular region in color. As shown, only the interior components within the selected circular region are displayed. The remainder of the image—the part not in the circular region—retains its original characteristics and is not augmented. The content augmenting the image is obtained from the loader's DT, as described herein.

Figure 15:
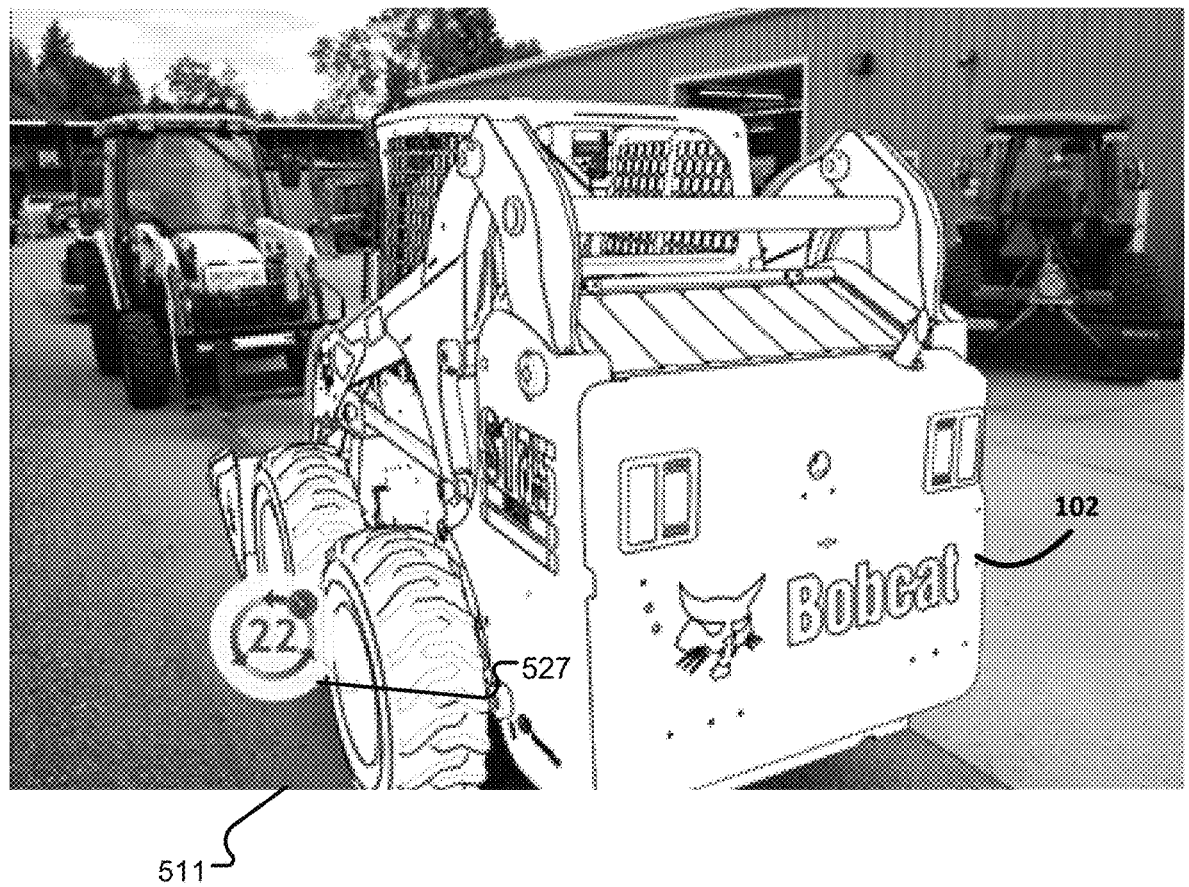

FIG. 15 shows the results of an action taken with respect to stored image 511 of loader 102. In this example, the action is to display, on image 511, the loader and its components in outline form, together with current sensor reading 527. The content augmenting the image is obtained from the loader's DT, as described herein.

Figure 16:
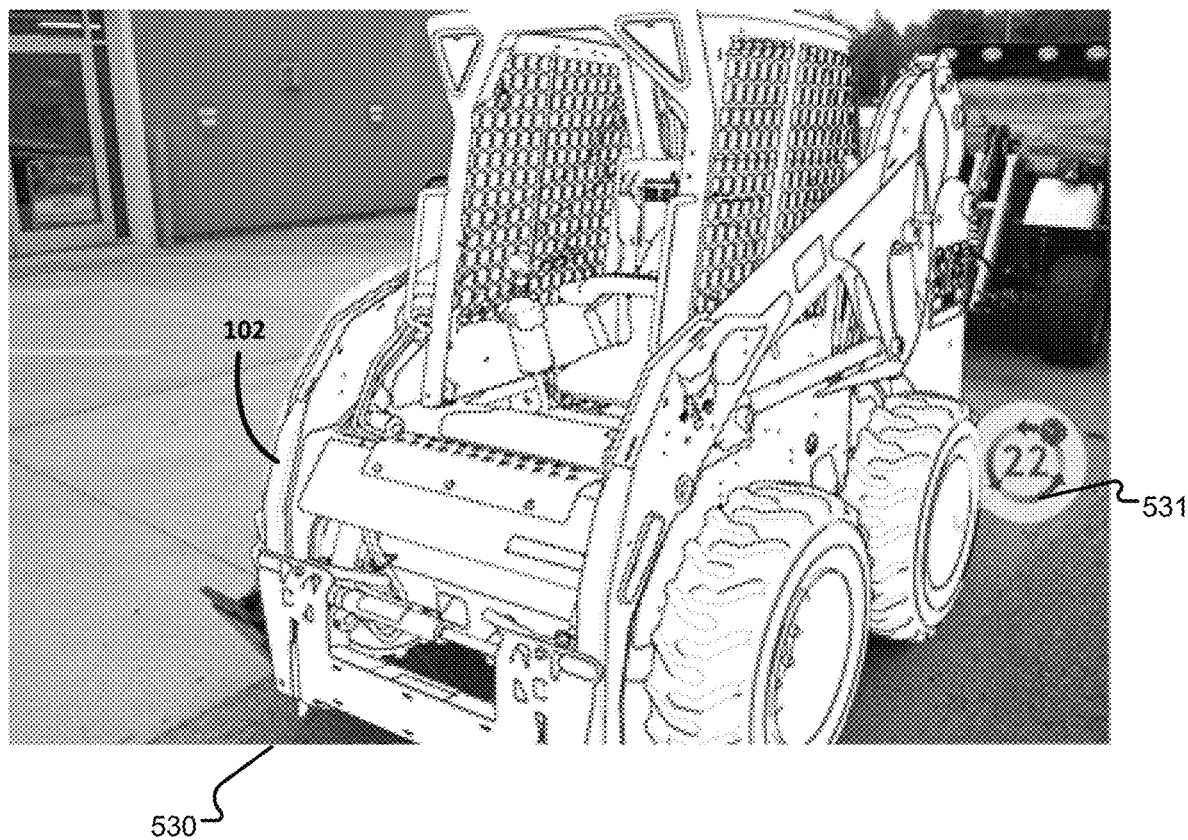

FIG. 16 shows the results of an action taken with respect to stored image 530 of loader 102, which is different from image 511 and may be part of an image sequence containing image 511, although that is not a requirement. In this example, the action is to display, on image 511, the loader and its components in outline form, together with current sensor reading 531. The content augmenting the image is obtained from the loader's DT, as described herein.

Figure 7:
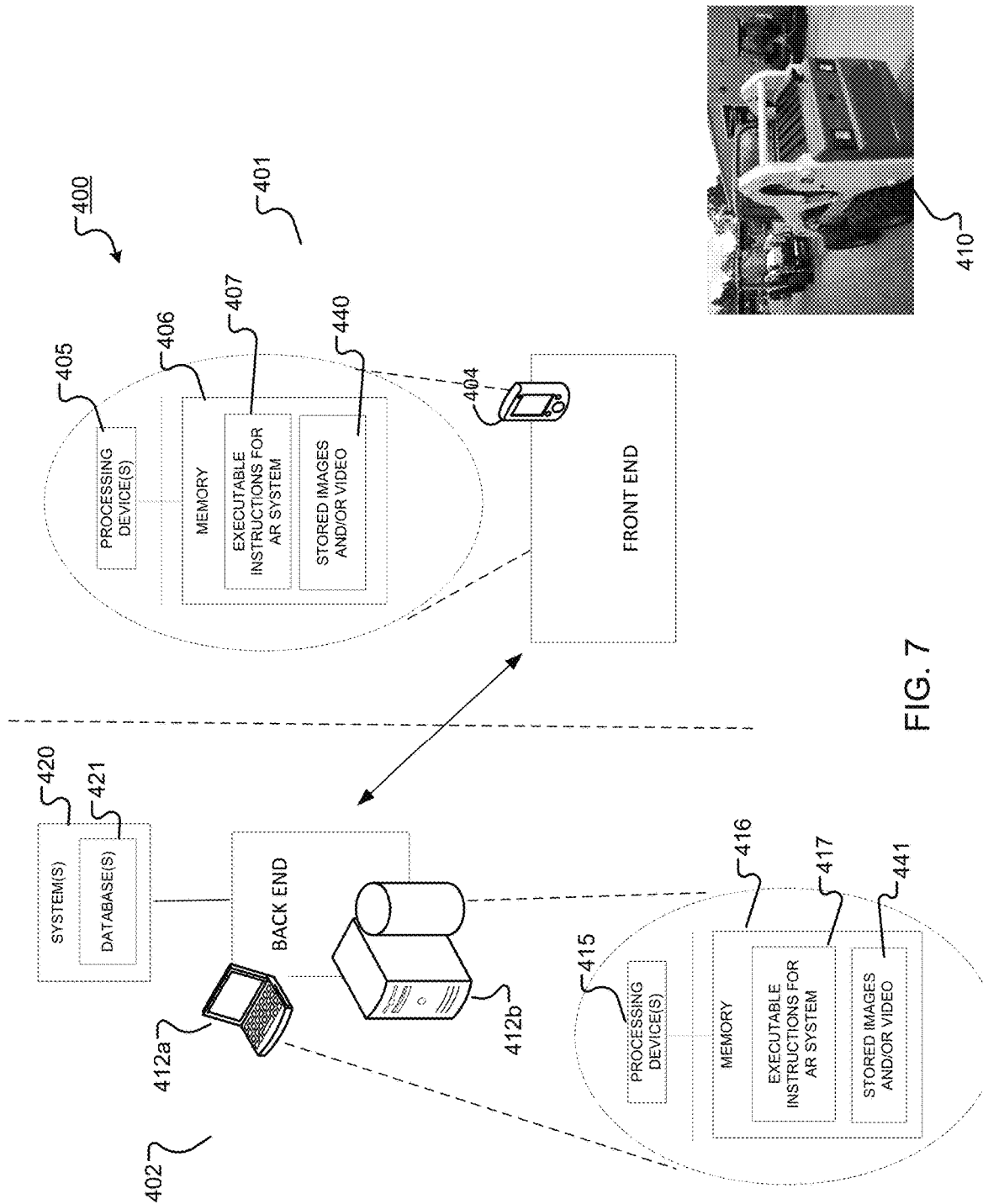
FIG. 7 is a block diagram of an example computer/network architecture on which the AR system described herein may be implemented.

FIG. 7 shows an example computer/network architecture 400 on which the example AR system and the example processes described herein, may be implemented. The AR system and processes, however, are not limited to use with the FIG. 7 architecture, and may be implemented on any appropriate computer architecture and/or network architecture.

In FIG. 7, example AR system 400 includes a front-end 401 and a back-end 402. Front-end 401 may include one or more mobile computing devices (or simply, mobile devices). A mobile device may include any appropriate device capable of displaying digital imagery including, but not limited to, digital (AR) glasses, a smartphone, a digital camera, a tablet computing device, and so forth. A mobile device 404 may include one or more processing devices 405 (e.g., microprocessors), and memory 406 storing instructions 407 that are executable by the one or more processing devices and images and/or video 440 that can be accessed and processed as described herein to generate AR content at a time subsequent to image capture. The instructions are part of one or more computer programs that are used to implement at least part of the AR system. For example, the instructions may be part of an application (or "app") that performs operations including, for example, displaying AR content to a user. Mobile device 404 also includes one or more sensing mechanisms, such as a camera for capturing actual graphics, such as images and video. Mobile device 404 may also be connected to, and accessible over, a wireless network, such as a long term evolution (LTE) network or a Wi-Fi network. The subject 410 of AR content may be any appropriate object, e.g., device, system, or entity, examples of which are described herein.

Back-end 402 may include one or more computing systems 412a, 412b examples of which include servers, desktop computers, and mobile devices. A back-end computing system may include one or more processing devices 415 (e.g., microprocessors), and memory 416 storing instructions 417 that are executable by the one or more processing devices and images and/or video 441 that can be accessed and processed as described herein to generate AR content at a time subsequent to image capture. The instructions are part of one or more computer programs that may be used to implement at least part of the AR system. For example, the instructions may be part of a computer program to generate DTs, to analyze DT content, to communicate with other systems 420 and databases 421 containing device information, and so forth. A back-end computing system may also be connected to, and accessible over, a wired or wireless network. In some implementations, the AR system described herein may not include the back-end 402, but rather may be implemented solely on the front-end.

Front-end 401 and back-end 402 may communicate with each other, and with other systems, such as those described herein, over one or more computer networks, which may include wireless and/or wired networks.

In some implementations, a front-end device may include a local computing system (e.g., 404) to render AR content and a back-end device may include a remote computing system (e.g., 412). The capabilities of these different devices may dictate where and/or how a DT, and thus AR content, is generated. For example, the DT and AR content may be generated locally; the DT and AR content may be generated remotely and only displayed locally; or the DT and AR content may be generated using a combination of local and remote processing resources. In some implementations, the local computing system may have no onboard sensing capability and be capable only of external monitoring; in some implementations, the local computing system may include basic onboard sensing and no processing capability;

in some implementations, the local computing system may include onboard sensing and basic processing capability; and in some implementations, the local computing system may include onboard sensing and processing capability equivalent at least to that of a desktop computer. In some implementations, there may be no remote computing device, but rather only mobile-to-mobile device connection; in some implementations, the remote computing system may be capable of only signal exchange, but not processing; in some implementations, the remote computing system may be capable of device and data management, basic processing, and routing to integrated peripheral systems; and in some implementations, the remote computing system may be capable of advanced servicing and data processing.

Figure 8:
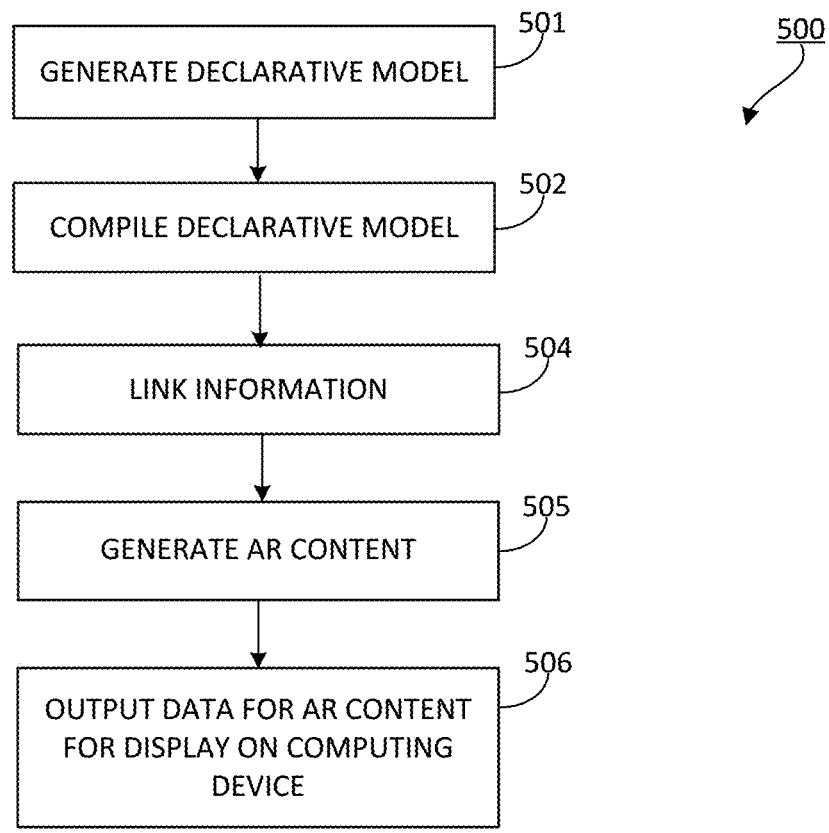
FIG. 8 is a flowchart showing an example process for generating AR content.

FIG. 8 shows an example process 500 for producing AR content from image data and 3D graphics data in the DT. Process 500 may be performed, e.g., on the architecture of FIG. 7. According to process 500, a declarative model is generated (501) for an object. The declarative model may be generated in computer code, and may include information to describe structures and functions of the object. The information may include semantic data that is stored in association with actual design data. In some examples, the declarative model of the object may be annotated to identify, among other things, features and attributes of the object. The annotations may include attributes of those features, such as size, shape, color, etc. Any appropriate techniques may be used to annotate the model. For example, metadata may be associated with specific features in the model. In some implementations, a look-up table (LUT) or other appropriate construct may be used to associate coordinates of the model with corresponding annotations.

The computer code defining the declarative model is compiled (502) to produce a compiled model. The compiled model is comprised of intermediate object code that can be read by an AR player. The declarative model, and thus the compiled model, defines the DT, or at least a part of the DT, for the object. In this example, the AR player may be executable on a front-end device of the AR system, and comprises computer code that is executable to generate AR content based on the compiled model and on an image (or other graphic) of the object.

To generate AR content for an object, the AR system links (504) information from the compiled model to corresponding information in an image (e.g., the stored image of the object), and generates (505) AR content based on the linked information. The AR system outputs (506) data representing the AR content for rendering on a display screen of a computing object, such as a tablet computing object. By way of example, the AR player may identify objects and their attributes that were selected as described herein. The compiled model may be read to locate the selected objects in the compiled model. Any appropriate number of attributes may be used to correlate features from the image to features in the compiled model. The AR system links the information from the compiled to the object shown in the image. For example, the compiled model may contain information describing the make, model, tread, and so forth of a tire. The compiled model may also contain sensor readings, or other information. That information is linked to the tire in the image. That information may be used to generate AR content, as described herein.

The AR player may generate AR content by rendering computer graphics generated from data in the DT over appropriate locations of the image. For example, the AR player may identify an element of a graphic in the manner described above, obtain information about that graphic from annotations and/or other information available in the compiled model, and generate the graphic based on information from the compiled model and/or sensor readings.

In some implementations, the computer graphics that form part of the AR content may overlay the same element shown in an image to enhance or explain an aspect of the element. In some implementations, the computer graphics do not overlay the element, but rather are adjacent to, or reference, the element. As noted, the AR content may be generated for an image or video, e.g., on a frame-by-frame basis. Thus, the AR content may be static (unchanging) or dynamic (changeable over time). In the case of video, features in frames of video may be identified using appropriate object identification and object tracking techniques. The computer graphics portion of the AR content may track movement frame-by-frame of the actual object during playback of the video. In the case of video, the DT for stored images or video may be generated or updated in real-time as described herein, and the resulting computer graphics superimposed on frames in real-time. Updating the DT may include changing the declarative model and the compiled model, and/or other data used to define the DT, as appropriate.

Computing systems that may be used to implement all or part of the front-end and/or back-end of the AR system may include various forms of digital computers. Examples of digital computers include, but are not limited to, laptops, desktops, workstations, personal digital assistants, servers, blade servers, mainframes, smart televisions and other appropriate computers. Mobile devices may be used to implement all or part of the front-end and/or back-end of the AR system. Mobile devices include, but are not limited to, tablet computing devices, personal digital assistants, cellular telephones, smartphones, digital cameras, digital glasses and other portable computing devices. The computing devices described herein, their connections and relationships, and their functions, are meant to be examples only, and are not meant to limit implementations of the technology.

All or part of the processes described herein and their various modifications (hereinafter referred to as "the processes") can be implemented, at least in part, via a computer program product, e.g., a computer program tangibly embodied in one or more information carriers, e.g., in one or more tangible machine-readable storage media, for execution by, or to control the operation of, data processing apparatus, e.g., a programmable processor, a computer, or multiple computers A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Non-transitory machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Each computing device, such as a tablet computer, may include a hard drive for storing data and computer programs, and a processing device (e.g., a microprocessor) and memory (e.g., RAM) for executing computer programs. Each computing device may include an image capture device, such as a still camera or video camera. The image capture device may be built-in or simply accessible to the computing device.

Each computing device may include a graphics system, including a display screen. A display screen, such as an LCD or a CRT (Cathode Ray Tube) displays, to a user, images that are generated by the graphics system of the computing device. As is well known, display on a computer display (e.g., a monitor) physically transforms the computer display. For example, if the computer display is LCD-based, the orientation of liquid crystals can be changed by the application of biasing voltages in a physical transformation that is visually apparent to the user. As another example, if the computer display is a CRT, the state of a fluorescent screen can be changed by the impact of electrons in a physical transformation that is also visually apparent. Each display screen may be touch-sensitive, allowing a user to enter information onto the display screen via a virtual keyboard. On some computing devices, such as a desktop or smartphone, a physical QWERTY keyboard and scroll wheel may be provided for entering information onto the display screen. Each computing device, and computer programs executed thereon, may also be configured to accept voice commands, and to perform functions in response to such commands. For example, the example processes described herein may be initiated at a client, to the extent possible, via voice commands.

Elements of different implementations described herein may be combined to form other implementations not specifically set forth above. Elements may be left out of the processes, computer programs, user interfaces, etc. described herein without adversely affecting their operation or the operation of the system in general. Furthermore, various separate elements may be combined into one or more individual elements to perform the functions described herein.

Other implementations not specifically described herein are also within the scope of the following claims.

What is claimed is:

1. A method performed by a computing system, comprising:
    obtaining an image of an object captured by an image capturing device in a vicinity of the object during relative motion between the object and the image capturing device;
    determining a location of the image capturing device relative to the object during image capture based on one or more attributes of the object in the image;
    storing, in computer memory, the image of the object and the location of the image capturing device during image capture;
    mapping a three-dimensional (3D) graphical model representing the object to the object in the image based, at least in part, on the location of the image capturing device;
    incorporating an update into the 3D graphical model after the 3D model has been mapped to the object in the image, the update representing a current state of at least part of the object that is different from the state of the object when the image was captured;
    after the image capturing device has moved away from the vicinity of the object and at a time after the update to the 3D graphical model has been incorporated, retrieving the image from the computer memory at a remote location;
    receiving, at the remote location and at a time after the image capturing device has moved away from the vicinity of the object, first data indicating selection by a user of the object in the image that was retrieved; and
    in response to receiving the first data, generating second data for use in rendering content on a display device at the remote location, the second data comprising information about the object selected and being based on the image stored, the location of the image capturing device stored, and the 3D graphical model containing the update;
    wherein the second data represents the image that was captured augmented with the current state of the at least part of the object obtained from the 3D graphical model containing the update.

2. The method of claim 1, wherein the first data indicates selection of part of the object in the image that was retrieved.

3. The method of claim 1, wherein the content comprises the image augmented with the current state of the at least part of the object.

4. The method of claim 1, wherein the 3D graphical model is part of a digital twin for the object that also includes at least some of the information, and
    wherein the method further comprises:
        receiving the update after the image has been captured;
        wherein the second data represents the image from a perspective of the image capturing device that is based on the location of the image capturing device.

5. The method of claim 1, wherein the 3D graphical model is part of a digital twin for the object that also includes at least some of the information, and
    wherein the method further comprises:
        receiving the update after the image has been captured;
        wherein the update is received from a sensor associated with the object, the sensor providing the update following capture of the image by the image capturing device, the current state comprising real-time content.

6. The method of claim 1, wherein the 3D graphical model is part of a digital twin for the object that also includes at least some of the information, and
    wherein the method further comprises:
        receiving the update after the image has been captured;
        wherein the update is received in real-time.

7. The method of claim 1, wherein the image is a frame of video captured by the image capturing device during the relative motion between the object and the image capturing device;
- wherein the location comprises a position and an orientation of the image capturing device relative to the object for each of multiple frames of the video; and
- wherein the content comprises the video overlaid with 3D graphical model content and real-time content and presented from a perspective of the image capturing device.

8. The method of claim 1, wherein determining the location comprises:
- obtaining a first size of the object shown in the image, the first size being among the one or more attributes;
- obtaining a second size of the object from the 3D graphical model; and
- comparing the first size to the second size to determine a distance between the device and the object, the distance being part of the location.

9. The method of claim 1, wherein determining the location comprises:
- identifying a feature of the object shown in the image, the feature being among the one or more attributes; and
- determining an orientation of the object relative to the image capturing device based on the feature and based on information about the object in the 3D graphical model, the orientation being part of the location.

10. The method of claim 1, wherein determining the location of the image capturing device comprises updating the location of the image capturing device as relative positions between the object and the image capturing device change; and
- wherein mapping the 3D graphical model to the object in the image is performed for updated locations of the image capturing device.

11. The method of claim 1, wherein mapping the 3D graphical model to the object in the image comprises associating parts of the 3D graphical model to corresponding parts of the object shown in the image, with a remainder of the 3D graphical model representing parts of the object not shown in the image being positioned relative to the parts of the 3D graphical model associated with the parts of the object shown in the image.

12. The method of claim 1, wherein at least some of the information represents components interior to the object.

13. One or more non-transitory machine-readable storage media storing instructions that are executable by one or more processing devices to perform operations comprising:
- obtaining an image of an object captured by an image capturing device in a vicinity of the object during relative motion between the object and the image capturing device;
- determining a location of the image capturing device relative to the object during image capture based on one or more attributes of the object in the image;
- storing, in computer memory, the image of the object and the location of the image capturing device during image capture;
- mapping a three-dimensional (3D) graphical model representing the object to the object in the image based, at least in part, on the location of the image capturing device;
- incorporating an update into the 3D graphical model after the 3D model has been mapped to the object in the image, the update representing a current state of at least part of the object that is different from the state of the object when the image was captured;
- after the image capturing device has moved away from the vicinity of the object and at a time after the update to the 3D graphical model has been incorporated, retrieving the image from the computer memory at a remote location;
- receiving, at the remote location and at a time after the image capturing device has moved away from the vicinity of the object, first data indicating selection by a user of the object in the image that was retrieved; and
- in response to receiving the first data, generating second data for use in rendering content on a display device at the remote location, the second data comprising information about the object selected and being based on the image stored, the location of the image capturing device stored, and the 3D graphical model containing the update;
- wherein the second data represents the image that was captured augmented with the current state of the at least part of the object obtained from the 3D graphical model containing the update.

14. The one or more non-transitory machine-readable storage media of claim 13, wherein determining the location comprises:
- obtaining a first size of the object shown in the image, the first size being among the one or more attributes;
- obtaining a second size of the object from the 3D graphical model; and
- comparing the first size to the second size to determine a distance between the device and the object, the distance being part of the location.

15. The one or more non-transitory machine-readable storage media of claim 13, wherein determining the location comprises:
- identifying a feature of the object shown in the image, the feature being among the one or more attributes; and
- determining an orientation of the object relative to the image capturing device based on the feature and based on information about the object in the 3D graphical model, the orientation being part of the location.

16. The one or more non-transitory machine-readable storage media of claim 13, wherein determining the location of the image capturing device comprises updating the location of the image capturing device as relative positions between the object and the image capturing device change; and
- wherein mapping the 3D graphical model to the object in the image is performed for updated locations of the image capturing device.

17. The one or more non-transitory machine-readable storage media of claim 13, wherein the first data indicates selection of part of the object in the image that was retrieved.

18. The one or more non-transitory machine-readable storage media of claim 13, wherein the content comprises the image augmented with the current state of the at least part of the object.

19. The one or more non-transitory machine-readable storage media of claim 13, wherein the 3D graphical model is part of a digital twin for the object that also includes at least some of the information, and
- wherein the operations comprise:
  - receiving the update after the image has been captured;
  - wherein the second data represents the image from a perspective of the image capturing device that is based on the location of the image capturing device.

20. The one or more non-transitory machine-readable storage media of claim 13, wherein the 3D graphical model is part of a digital twin for the object that also includes at least some of the information, and
   wherein the operations comprise:
      receiving the update after the image has been captured;
      wherein the update is received from a sensor associated with the object, the sensor providing the update following capture of the image by the image capturing device, the current state comprising real-time content.

21. The one or more non-transitory machine-readable storage media of claim 13, wherein the 3D graphical model is part of a digital twin for the object that also includes at least some of the information, and
   wherein the operations comprise:
      receiving the update after the image has been captured;
      wherein the update is received in real-time.

22. The one or more non-transitory machine-readable storage media of claim 13, wherein the image is a frame of video captured by the image capturing device during the relative motion between the object and the image capturing device;
   wherein the location comprises a position and an orientation of the image capturing device relative to the object for each of multiple frames of the video; and
   wherein the content comprises the video overlaid with 3D graphical model content and real-time content and presented from a perspective of the image capturing device.

23. The one or more non-transitory machine-readable storage media of claim 13, wherein mapping the 3D graphical model to the object in the image comprises associating parts of the 3D graphical model to corresponding parts of the object shown in the image, with a remainder of the 3D graphical model representing parts of the object not shown in the image being positioned relative to the parts of the 3D graphical model associated with parts of the object shown in the image.

24. The one or more non-transitory machine-readable storage media of claim 13, wherein at least some of the information represents components interior to the object.

25. A system comprising:
   one or more non-transitory machine-readable storage media storing instructions that are executable; and
   one or more processing devices to execute the instructions to perform operations comprising:
      obtaining an image of an object captured by an image capturing device in a vicinity of the object during relative motion between the object and the image capturing device;
      determining a location of the image capturing device relative to the object during image capture based on one or more attributes of the object in the image;
      storing, in computer memory, the image of the object and the location of the image capturing device during image capture;
      mapping a three-dimensional (3D) graphical model representing the object to the object in the image based, at least in part, on the location of the image capturing device;
      incorporating an update into the 3D graphical model after the 3D model has been mapped to the object in the image, the update representing a current state of at least part of the object that is different from the state of the object when the image was captured;
      after the image capturing device has moved away from the vicinity of the object and at a time after the update to the 3D graphical model has been incorporated, retrieving the image from the computer memory at a remote location;
      receiving, at the remote location and at a time after the image capturing device has moved away from the vicinity of the object, first data indicating selection by a user of the object in the image that was retrieved; and
      in response to receiving the first data, generating second data for use in rendering content on a display device at the remote location, the second data comprising information about the object selected and being based on the image stored, the location of the image capturing device stored, and the 3D graphical model containing the update;
      wherein the second data represents the image that was captured augmented with the current state of the at least part of the object obtained from the 3D graphical model containing the update.

26. The system of claim 25, wherein determining the location comprises:
   obtaining a first size of the object shown in the image, the first size being among the one or more attributes;
   obtaining a second size of the object from the 3D graphical model; and
   comparing the first size to the second size to determine a distance between the device and the object, the distance being part of the location.

27. The system of claim 25, wherein determining the location comprises:
   identifying a feature of the object shown in the image, the feature being among the one or more attributes; and
   determining an orientation of the object relative to the device based on the feature and based on information about the object in the 3D graphical model, the orientation being part of the location.

28. The system of claim 25, wherein determining the location of the image capturing device comprises updating the location of the image capturing device as relative positions between the object and the image capturing device change; and
   wherein mapping the 3D graphical model to the object in the image is performed for updated locations of the image capturing device.

29. The system of claim 25, wherein the first data indicates selection of part of the object in the image that was retrieved.

30. The system of claim 25, wherein the content comprises the image augmented with the current state of the at least part of the object.

31. The system of claim 25, wherein the 3D graphical model is part of a digital twin for the object that also includes at least some of the information, and
   wherein the operations comprise:
      receiving the update after the image has been captured;
      wherein the second data represents the image from a perspective of the image capturing device that is based on the location of the image capturing device.

32. The system of claim 25, wherein the 3D graphical model is part of a digital twin for the object that also includes at least some of the information, and
   wherein the operations comprise:
      receiving the update after the image has been captured;
      wherein the update is received from a sensor associated with the object, the sensor providing the update following capture of the image by the image capturing device, the current state comprising real-time content.

33. The system of claim 25, wherein the 3D graphical model is part of a digital twin for the object that also includes at least some of the information, and
wherein the operations comprise:
receiving the update after the image has been captured;
wherein the update is received in real-time.

34. The system of claim 25, wherein the image is a frame of video captured by the image capturing device during the relative motion between the object and the image capturing device;
wherein the location comprises a position and an orientation of the image capturing device relative to the object for each of multiple frames of the video; and
wherein the content comprises the video overlaid with 3D graphical model content and real-time content and presented from a perspective of the image capturing device.

35. The system of claim 25, wherein mapping the 3D graphical model to the object in the image comprises associating parts of the 3D graphical model to corresponding parts of the object shown in the image, with a remainder of the 3D graphical model representing parts of the object not shown in the image being positioned relative to the parts of the 3D graphical model associated with the parts of the object shown in the image.

36. The system of claim 25, wherein at least some of the information represents components interior to the object.

* * * * *